United States Patent
Ito

(10) Patent No.: US 7,738,183 B2
(45) Date of Patent: Jun. 15, 2010

(54) ZOOM LENS AND IMAGE PICKUP APPARATUS HAVING THE SAME

(75) Inventor: Daisuke Ito, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/335,369

(22) Filed: Dec. 15, 2008

(65) Prior Publication Data

US 2009/0161230 A1    Jun. 25, 2009

(30) Foreign Application Priority Data

Dec. 19, 2007    (JP) ............................. 2007-327089

(51) Int. Cl.
G02B 15/14    (2006.01)
(52) U.S. Cl. ...................... 359/682; 359/689
(58) Field of Classification Search ................. 359/680, 359/682, 689; 348/240.99–240.3, 335–369; 396/72–88
See application file for complete search history.

(56) References Cited

U.S. PATENT DOCUMENTS

| | | | |
|---|---|---|---|
| 4,838,666 A | 6/1989 | Shiraishi | |
| 6,038,084 A * | 3/2000 | Okada et al. | 359/689 |
| 6,498,687 B1 | 12/2002 | Sekita | |
| 6,545,819 B1 | 4/2003 | Nanba | |
| 6,597,513 B2 | 7/2003 | Minefuji | |
| 6,822,808 B2 | 11/2004 | Nanba | |
| 6,862,143 B2 | 3/2005 | Hoshi | |
| 6,999,242 B2 | 2/2006 | Nanba | |
| 7,019,911 B2 | 3/2006 | Saruwatari | |
| 7,023,625 B2 | 4/2006 | Nanba | |
| 7,054,072 B2 | 5/2006 | Sato | |
| 7,113,347 B2 | 9/2006 | Nanba | |
| 7,113,348 B2 | 9/2006 | Nanba | |
| 7,215,483 B2 | 5/2007 | Sekita | |
| 7,227,701 B2 | 6/2007 | Nanba | |
| 7,286,297 B2 | 10/2007 | Kawakami | |
| 2008/0151385 A1 * | 6/2008 | Ohashi | 359/689 |
| 2009/0034090 A1 * | 2/2009 | Eguchi | 359/684 |

FOREIGN PATENT DOCUMENTS

| | | |
|---|---|---|
| JP | 4-217219 | 8/1992 |
| JP | 7-261083 | 10/1995 |
| JP | 2004-109153 | 4/2004 |
| JP | 2005-24804 | 1/2005 |
| JP | 2006-65034 | 3/2006 |

* cited by examiner

*Primary Examiner*—Darryl J Collins
(74) *Attorney, Agent, or Firm*—Canon U.S.A., Inc., IP Division

(57) ABSTRACT

A zoom lens includes, in order from an object side to an image side, a first lens unit having a negative refractive power, a second lens unit having a positive refractive power, the second lens unit including a positive lens, and a third lens unit having a positive refractive power. In the zoom lens, intervals between adjacent ones of the first lens unit, the second lens unit, and the third lens unit are variable during zooming. In the zoom lens, a refractive power of a material of the positive lens included in the second lens unit (Nd2P) and an Abbe number of the material of the positive lens included in the second lens unit (vd2P) satisfy the following conditions:

$Nd2P + 0.01 \times vd2P > 2.3$ $1.65 < Nd2P < 2.7$ $vd2P > 45$.

12 Claims, 15 Drawing Sheets

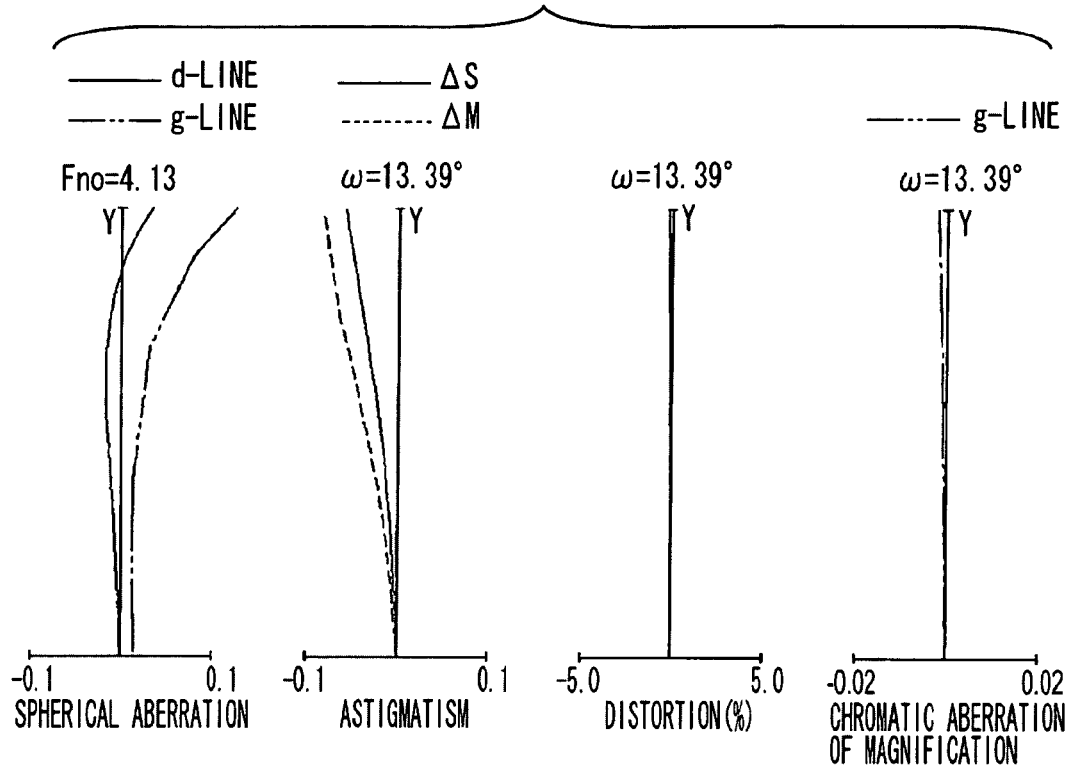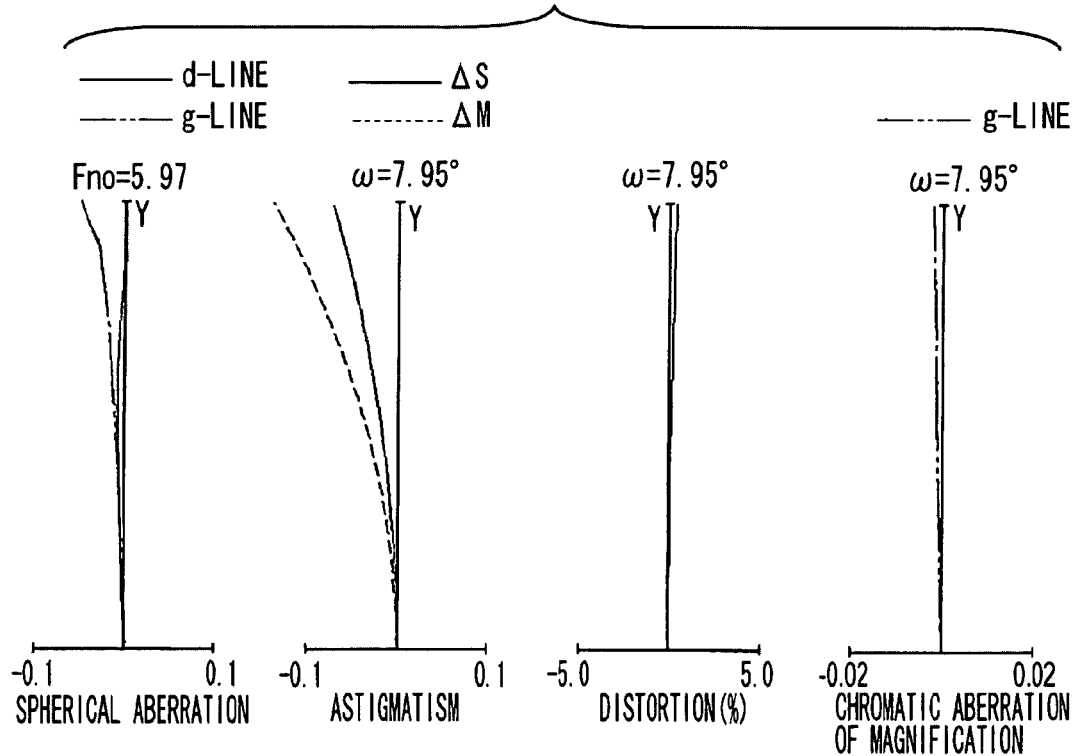

ZOOM LENS AND IMAGE PICKUP APPARATUS HAVING THE SAME

BACKGROUND OF THE INVENTION

1. Field of the Invention

The present invention relates to a zoom lens suitable to a still camera, a video camera, and a digital still camera and an image pickup apparatus having the same.

2. Description of the Related Art

In recent years, an image pickup apparatus (camera) using a solid-state image sensor such as a video camera or a digital still camera is more and more small-sized and has a high function. In this regard, it is desired that in a photographic optical system used in the image pickup apparatus like this, the total size of a lens system is small and that the zoom lens has a high optical performance.

In a camera like this, various optical members such as a low-pass filter or a color correction filter are disposed between a lens rearmost portion and an image sensor. Accordingly, it is desired that the zoom lens used in such an image pickup apparatus has a relatively long back focus.

Furthermore, it is desired that in a camera using an image sensor for a color image, chromatic aberration of magnification is effectively corrected. Furthermore, it is desired that a zoom lens used in such an image pickup apparatus has a high telecentric performance on an image side to prevent color shading.

In this regard, U.S. Pat. No. 6,498,687 discusses a three-unit zoom lens including, in order from the object side to the image side, a first lens unit having a negative refractive power, a second lens unit having a positive refractive power, and a third lens unit having a positive refractive power, which is small-sized and has a high telecentricity on the image side.

In addition, U.S. Pat. No. 4,838,666 discusses a three-unit zoom lens of the above-described zoom type. The three-unit zoom lens of the above-described zoom type has a long back focus, a high telecentric performance on the image side, and a wide angle of view. In this regard, U.S. Pat. No. 6,038,084 discusses a three-unit zoom lens of the above-described zoom type having a zoom ratio as high as 3 or higher.

Furthermore, in recent years, light transmissive ceramic has been developed and a photographing optical system that uses light transmissive ceramic as a material of an optical member is conventionally used. In this regard, the light transmissive ceramic has a refractive index higher than that of optical glass. In addition, the hardness and the strength of light transmissive ceramic are higher than those of optical glass. A conventional image pickup apparatus utilizes these characteristics of the light transmissive ceramic and thereby reduces the total thickness of a lens system thereof.

Meanwhile, a so-called short zoom type two-unit zoom lens having a wide angle of view has been conventionally used, which is constituted by two lens units, namely, a first lens unit having a negative refractive power and a second lens unit having a positive refractive power, and changes the interval between the first and the second lens units to perform magnification. In this regard, U.S. Pat. No. 7,054,072 discusses a two-unit zoom lens that uses the above-described the light transmissive ceramic as a material of a negative lens in the second lens unit. Thus, the zoom lens discussed in U.S. Pat. No. 7,054,072 reduces the total size its lens system.

In recent years, it is desired that a zoom lens used in an image pickup apparatus has a high zoom ratio and the total size of the lens system is small. Generally, in order to reduce the size of a zoom lens, the number of lenses is reduced while intensifying the refractive power of each lens unit constituting the zoom lens.

However, if the number of lenses is reduced while intensifying the refractive power of each lens unit, the lens thickness increases. Accordingly, in this case, the size of the lens system cannot be appropriately reduced. Furthermore, in this case, it becomes difficult to effectively correct various aberrations. Accordingly, in order to reduce the total size of a lens system while increasing the zoom ratio, it is significant to appropriately set the zoom type, the refractive power of each lens unit, and the configuration of each lens constituting each lens unit.

In addition, in order to achieve a zoom lens having a high zoom ratio and whose lens system is small-sized, it is also significant to select the material of each lens constituting the lens unit by appropriately setting the refractive power and the Abbe number so that various aberrations such as chromatic aberration of magnification occurring at each zoom position can be suppressed or reduced. The refractive index, the hardness, and the flexural strength of the above-described light transmissive ceramic are higher than those of ordinary optical glass. It is useful in effectively correcting aberrations and reducing the total size of an optical system to use the light transmissive ceramic having the above-described characteristics as an optical material.

However, in the case where a lens made of such light transmissive ceramic is merely used in a zoom lens, the zoom lens may not have a high optical performance for the entire zoom range. In order to achieve a high zoom ratio while reducing the total size of a lens system with a lens made of the above-described light transmissive ceramic, it is significant to appropriately set the zoom type, the refractive power of each lens unit, and the configuration of the lens in each lens unit.

On the other hand, in the case where the zoom ratio of a zoom lens is increased and thus a focal length at a telephoto end becomes long, the material of the lens may expand due to the change (rise) in the temperature. Accordingly, in this case, a phenomenon of defocusing may occur and thus the optical performance of the zoom lens may degrade. Accordingly, with respect to the above-described three-unit zoom lens, in order to reduce the total size of the lens system and to achieve a zoom lens having a wide angle of view and a high zoom ratio, it is significant to appropriately set the configuration of the lens in each lens unit and to use an optimal material of the lens in each lens unit.

In this regard, if the configuration of the lens in a second or a third lens unit is inappropriately set or if an inappropriate material is used as a material of the lens in the second or the third lens unit, then the aberration may greatly vary during zooming. In this case, it becomes difficult to achieve a high optical performance for the entire zoom range.

SUMMARY OF THE INVENTION

The present invention is directed to a three-unit zoom lens having a high optical performance with an appropriately-set configuration of a lens included in a second and a third lens unit, whose total size of a lens system is small, and having a high zoom ratio.

Furthermore, the present invention is directed to a zoom lens suitable to an image pickup apparatus using a solid-state image sensor.

According to an aspect of the present invention, a zoom lens includes, in order from an object side to an image side, a first lens unit having a negative refractive power, a second lens unit having a positive refractive power, the second lens unit including a positive lens, and a third lens unit having a positive refractive power. In the zoom lens, intervals between adjacent ones of the first lens unit, the second lens unit, and the third lens unit are variable during zooming. Furthermore, in the zoom lens, a refractive power of a material of the positive lens included in the second lens unit (Nd2P) and an Abbe number of the material of the positive lens included in the second lens unit (vd2P) satisfy the following conditions:

$$Nd2P+0.01\times vd2P>2.3$$

$$1.65<Nd2P<2.7$$

$$vd2P>45.$$

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to describe the principles of the present invention.

FIG. 3 is an aberration chart for a zoom lens at a middle zoom position according to the first exemplary embodiment of the present invention.

FIG. 4 is an aberration chart for a zoom lens at the telephoto end according to the first exemplary embodiment of the present invention.

DESCRIPTION OF THE EMBODIMENTS

Figure 1:
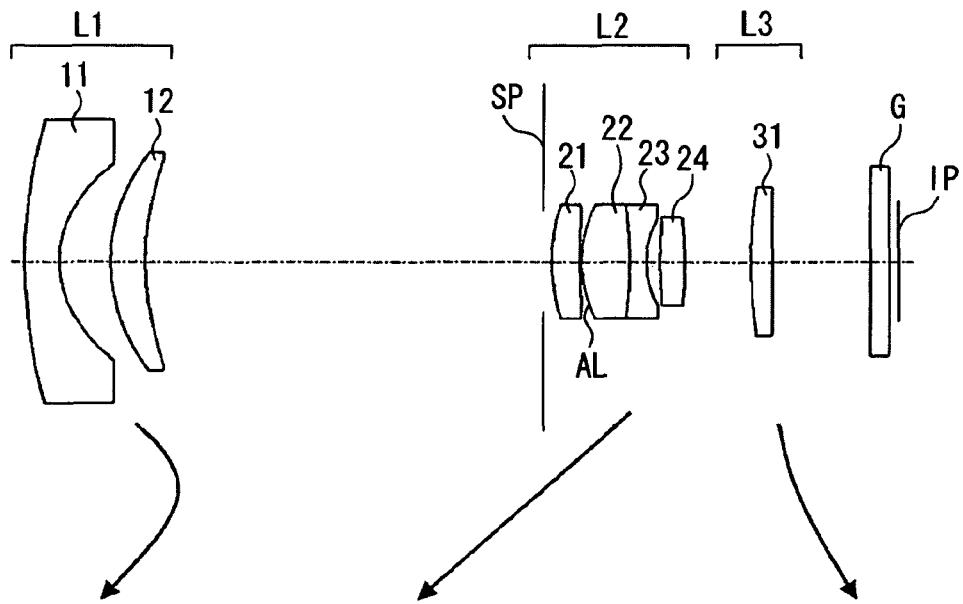
FIG. 1 is a lens cross section of a zoom lens according to a first exemplary embodiment of the present invention.

Various exemplary embodiments, features, and aspects of the invention will be described in detail below with reference to the drawings. It should be noted that the relative arrangement of the components, the numerical expressions and numerical values set forth in these embodiments do not limit the scope of the present invention unless it is specifically stated otherwise.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F-number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Note that herein when referring to correcting or corrections of an error (e.g., an aberration), a reduction of the error and/or a correction of the error is intended.

A zoom lens according to an exemplary embodiment of the present invention includes, in order from an object side (an enlargement side, an enlargement conjugate side, or a front side) to an image side (a reduction side, a reduction conjugate side, or a rear side), a first lens unit having a negative refractive power, a second lens unit having a positive refractive power, and a third lens unit having a positive refractive power.

Here, it is not always necessary for each of the first, the second, and the third lens units to include a plurality of lenses. That is, each of the first, the second, and the third lens units can be constituted by one lens. In each of the exemplary embodiments described below, the third lens unit is constituted by one lens. More specifically, the third lens unit has only one lens element having a refractive power (optical power). That is, the third lens unit can include a filter, a stop, and an optical member having (substantially) no refractive power.

Furthermore, the intervals between adjacent ones of the first lens unit, the second lens unit, and the third unit are variable during zooming. More specifically, during zooming from the wide-angle end to the telephoto end, the first lens unit moves along a locus convex towards the image side. Furthermore, in this regard, the second lens unit moves towards the object side and the third lens unit moves towards the image side.

Figure 2:
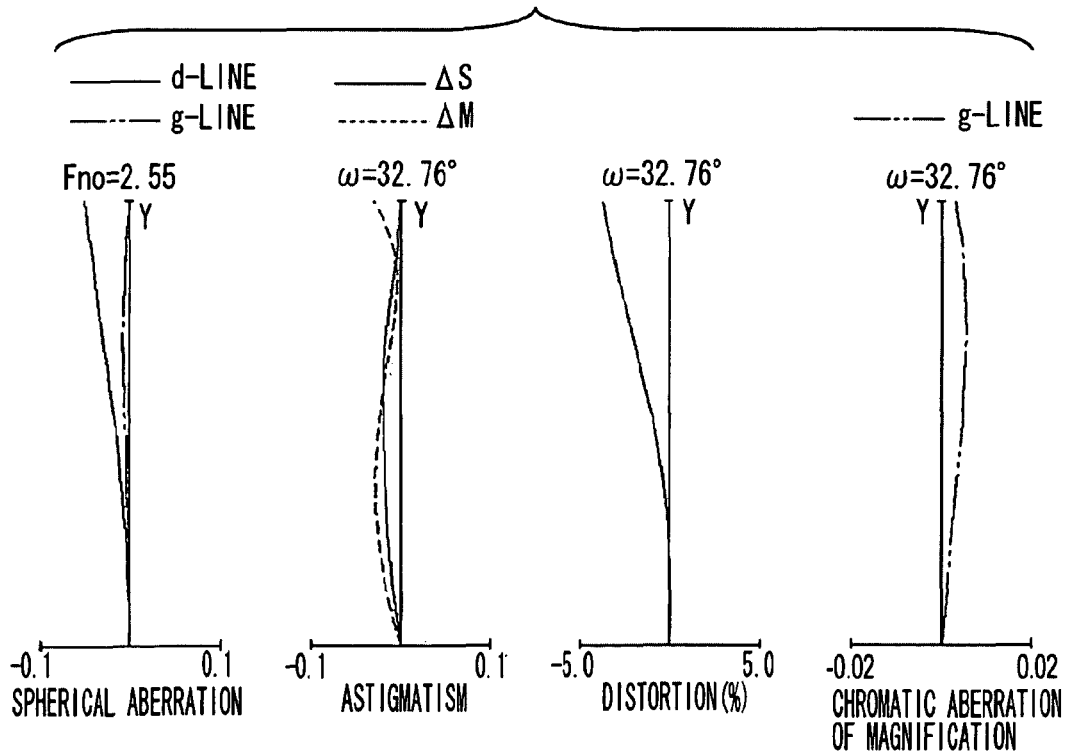
FIG. 2 is an aberration chart for a zoom lens at the wide-angle end according to the first exemplary embodiment of the present invention.

FIG. 1 is a lens cross section of the zoom lens at the wide-angle end (short focal length end) according to the first exemplary embodiment of the present invention. FIG. 2 is an aberration chart for the zoom lens on wide-angle end according to the first exemplary embodiment of the present invention. FIG. 3 is an aberration chart for the zoom lens at a middle zoom position according to the first exemplary embodiment of the present invention. FIG. 4 is an aberration chart for the zoom lens at the telephoto end (long focal length end) according to the first exemplary embodiment of the present invention. The first exemplary embodiment is a zoom lens having a zoom ratio of about 4.6 and an aperture ratio of about 2.6-6.0.

Figure 5:
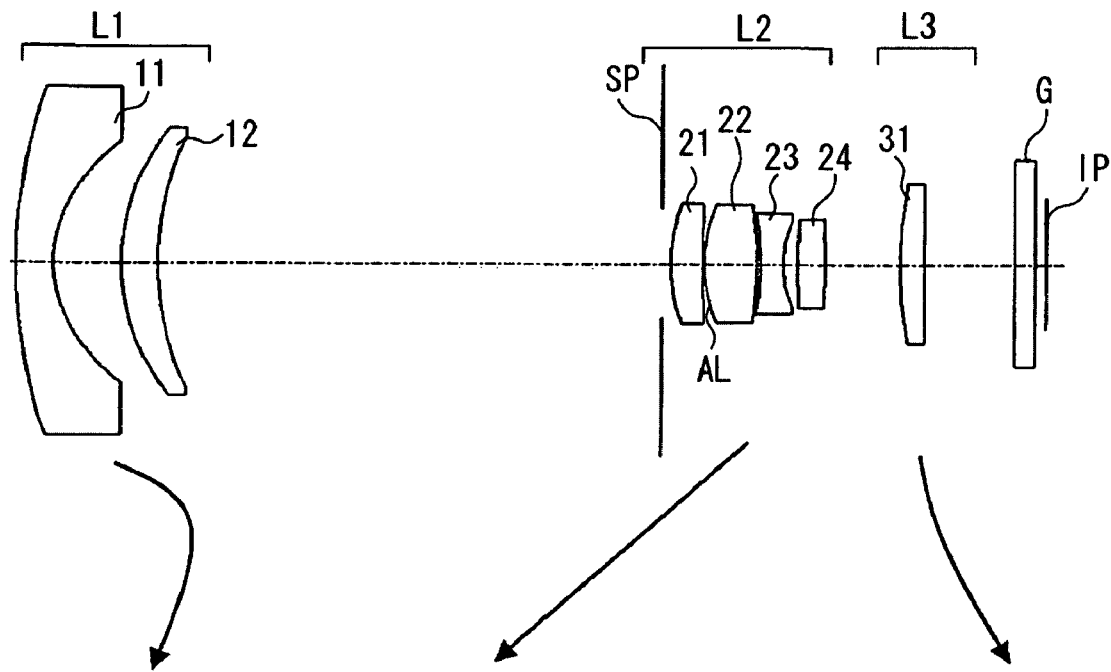
FIG. 5 is a lens cross section of a zoom lens according to a second exemplary embodiment of the present invention.
Figure 6:
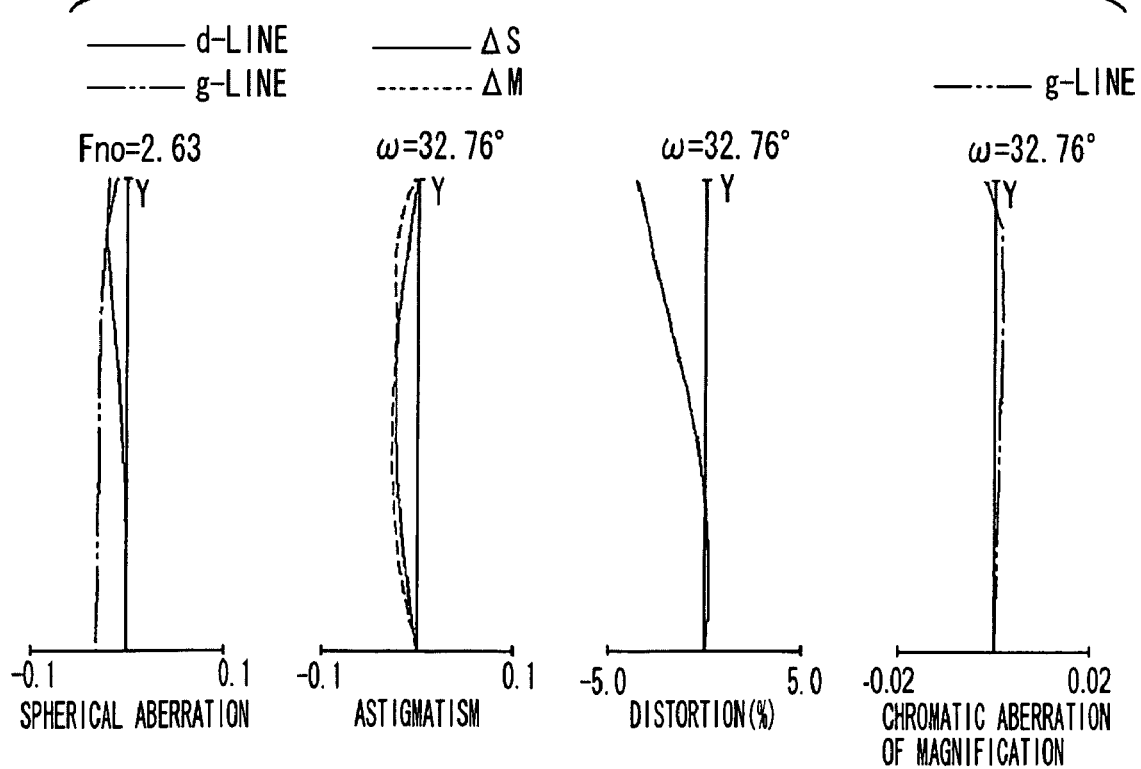
FIG. 6 is an aberration chart for a zoom lens at the wide-angle end according to the second exemplary embodiment of the present invention.
Figure 7:
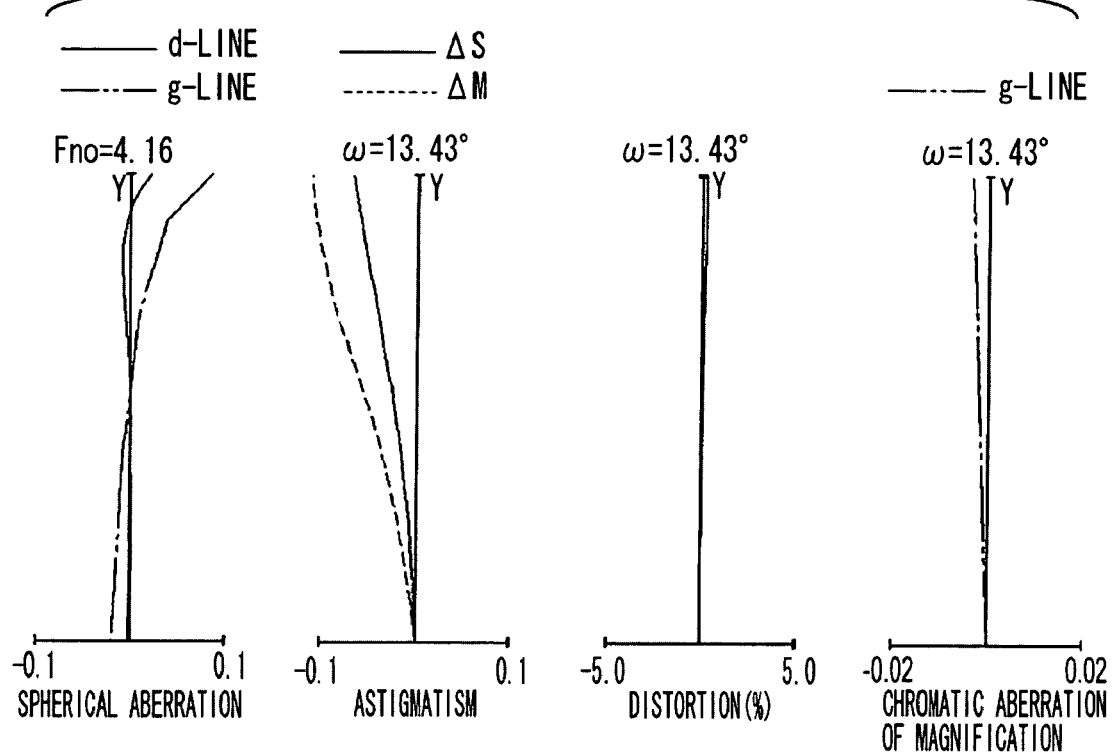
FIG. 7 is an aberration chart for a zoom lens at a middle zoom position according to the second exemplary embodiment of the present invention.
Figure 8:
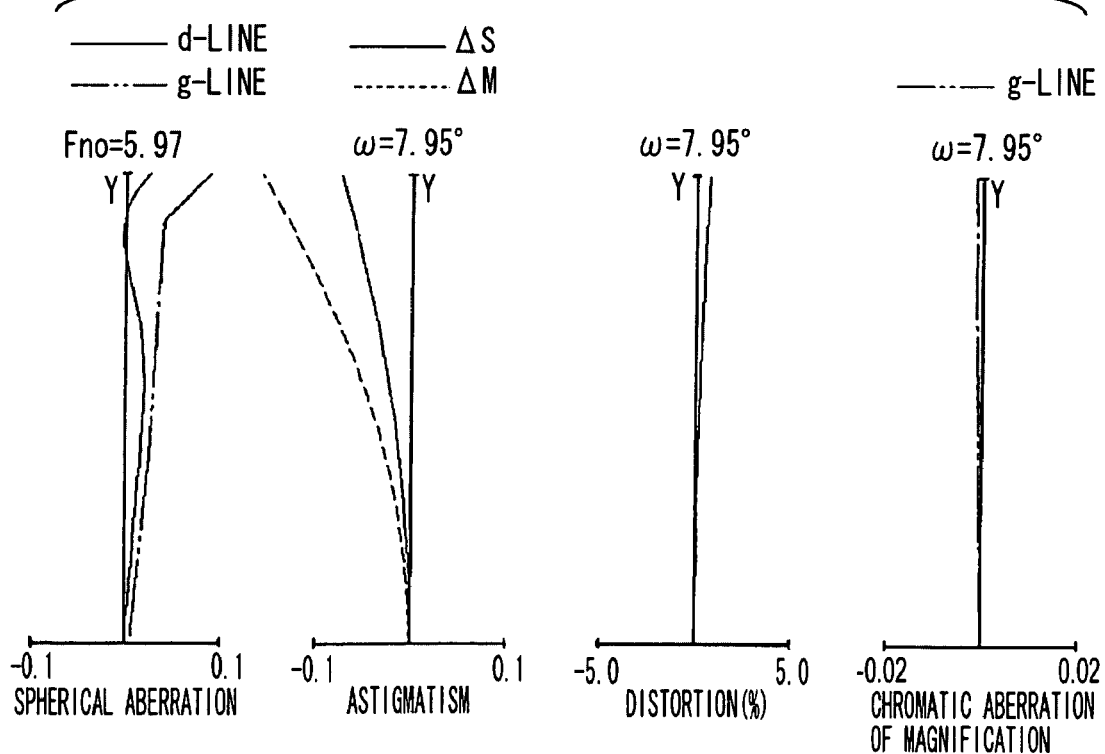
FIG. 8 is an aberration chart for a zoom lens at the telephoto end according to the second exemplary embodiment of the present invention.

FIG. 5 is a lens cross section of a zoom lens according to a second exemplary embodiment of the present invention. FIG. 6 is an aberration chart for the zoom lens at the wide-angle end according to the second exemplary embodiment of the present invention. FIG. 7 is an aberration chart for the zoom lens at a middle zoom position according to the second exemplary embodiment of the present invention. FIG. 8 is an aberration chart for the zoom lens at the telephoto end according to the second exemplary embodiment of the present invention. The second exemplary embodiment is a zoom lens having a zoom ratio of about 3.6 and an aperture ratio of about 2.6-6.0.

Figure 9:
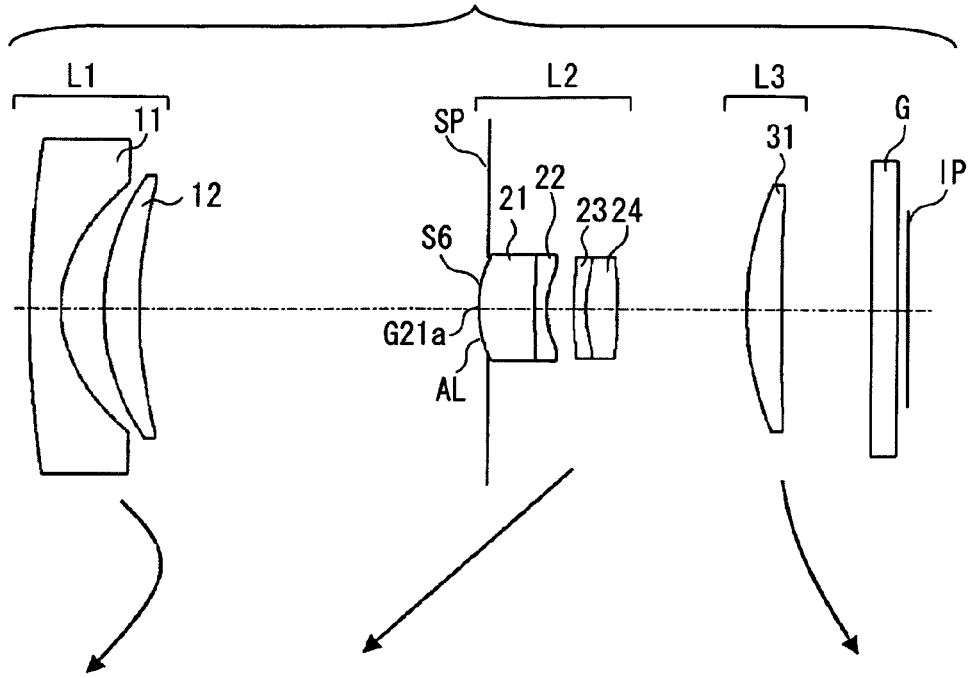
FIG. 9 is a lens cross section of a zoom lens according to a third exemplary embodiment of the present invention.
Figure 10:
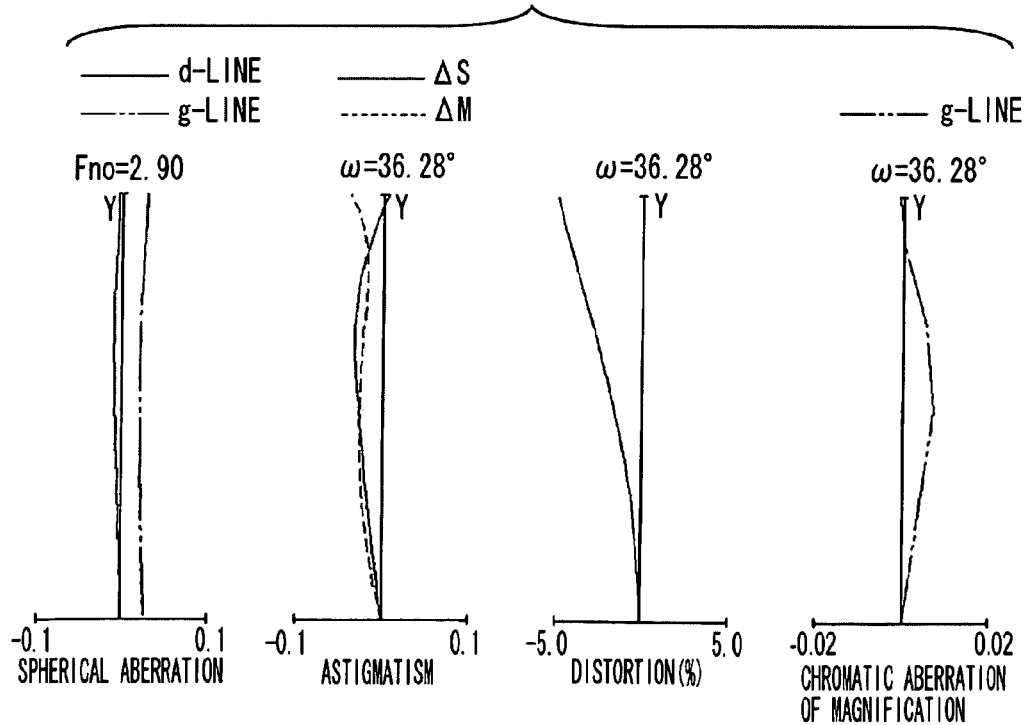
FIG. 10 is an aberration chart for a zoom lens at the wide-angle end according to the third exemplary embodiment of the present invention.
Figure 11:
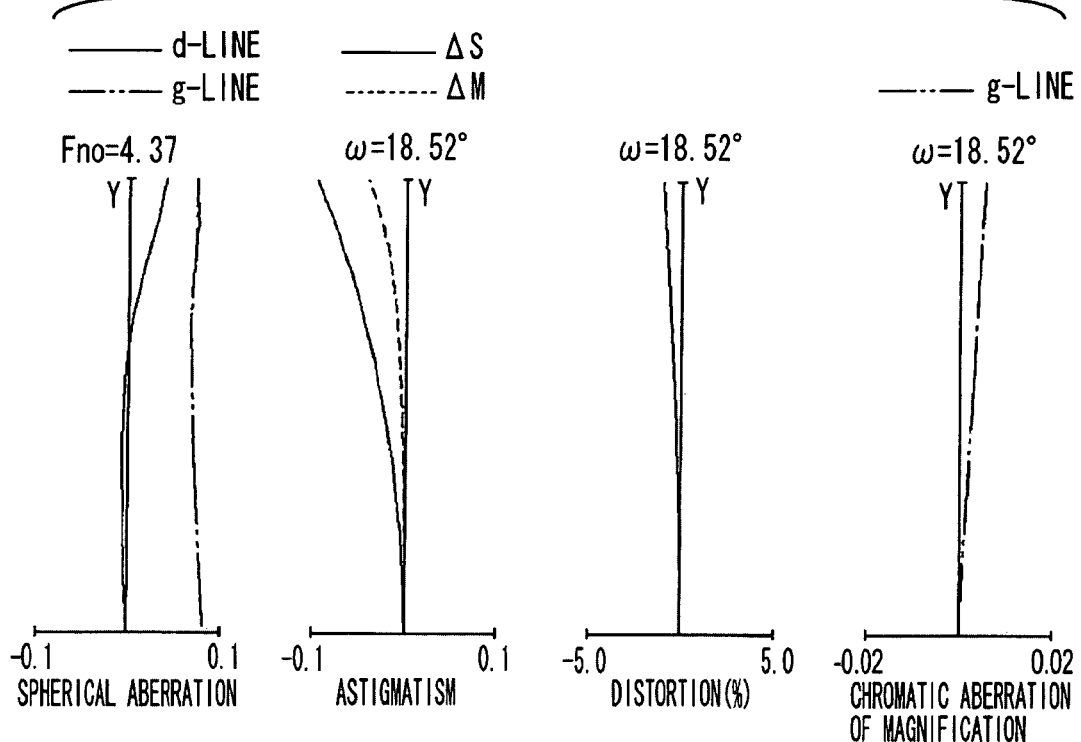
FIG. 11 is an aberration chart for a zoom lens at a middle zoom position according to the third exemplary embodiment of the present invention.
Figure 12:
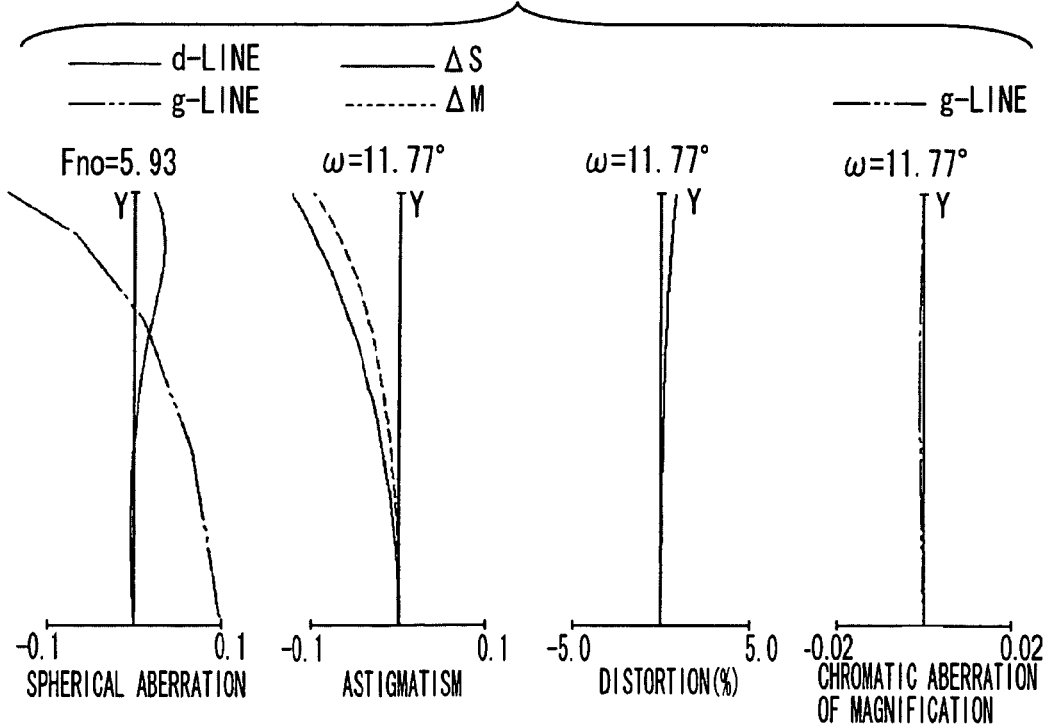
FIG. 12 is an aberration chart for a zoom lens at the telephoto end according to the third exemplary embodiment of the present invention.

FIG. 9 is a lens cross section of a zoom lens according to a third exemplary embodiment of the present invention. FIG. 10 is an aberration chart for a zoom lens at the wide-angle end according to the third exemplary embodiment of the present invention. FIG. 11 is an aberration chart for the zoom lens at a middle zoom position according to the third exemplary embodiment of the present invention. FIG. 12 is an aberration chart for the zoom lens at the telephoto end according to the third exemplary embodiment of the present invention. The third exemplary embodiment is a zoom lens having a zoom ratio of about 3.5 and an aperture ratio of about 2.9-5.9.

Figure 13:
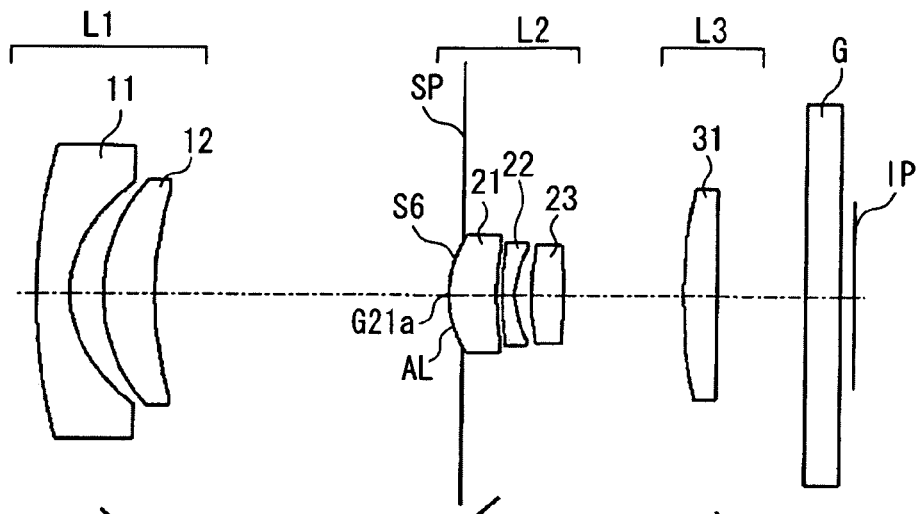
FIG. 13 is a lens cross section of a zoom lens according to a fourth exemplary embodiment of the present invention.
Figure 14:
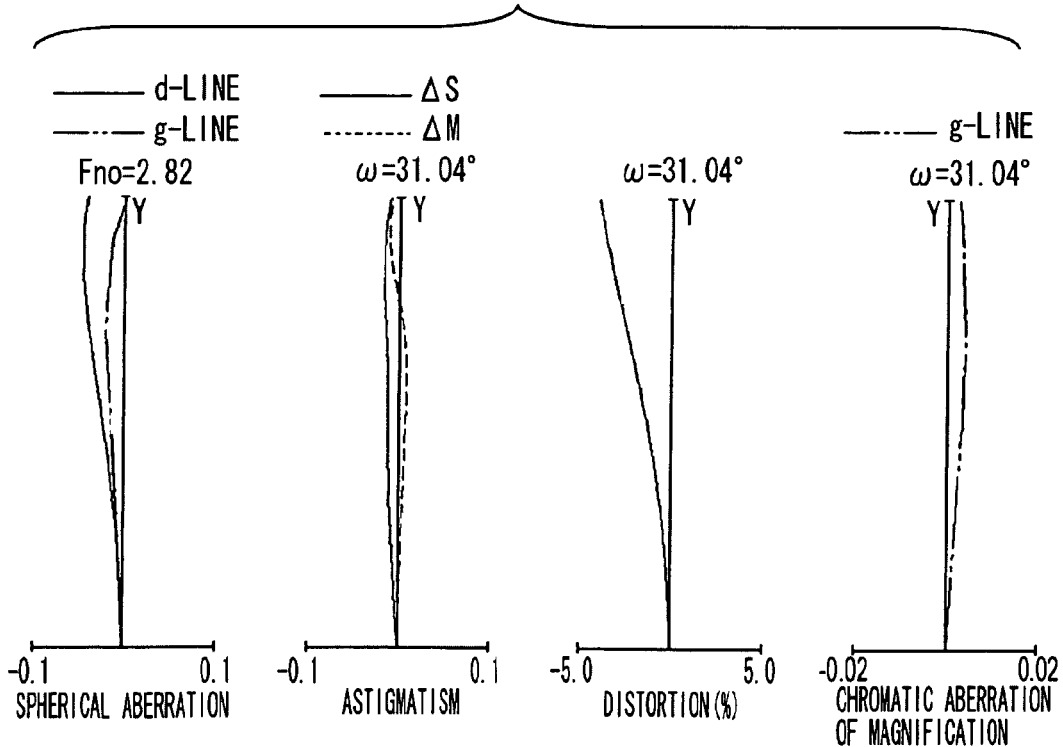
FIG. 14 is an aberration chart for a zoom lens at the wide-angle end according to the fourth exemplary embodiment of the present invention.
Figure 15:
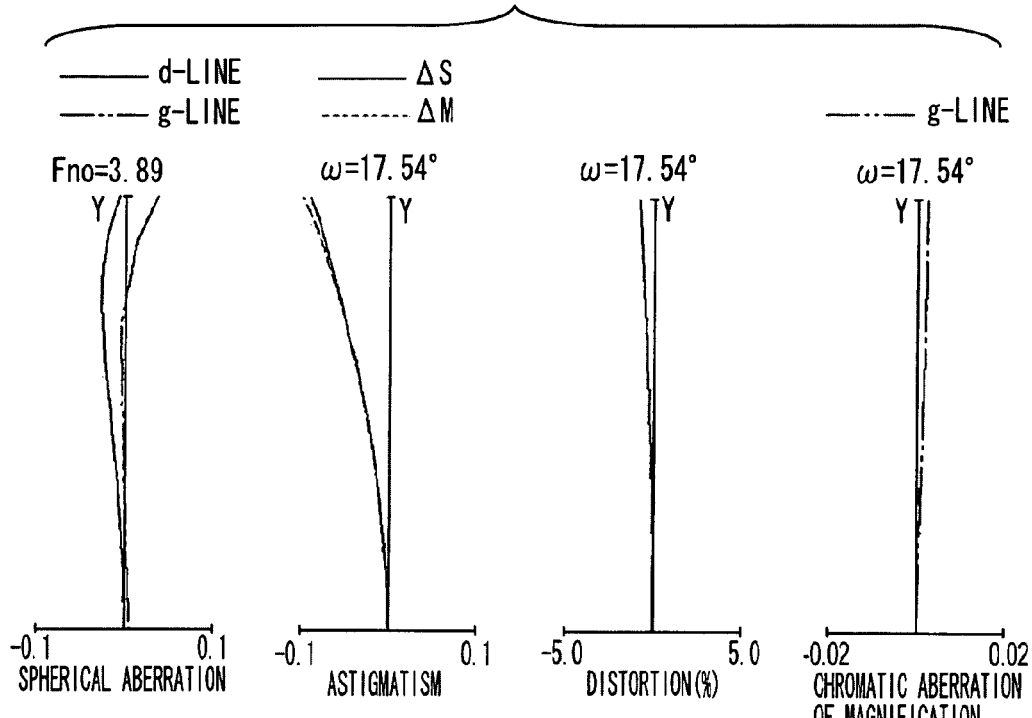
FIG. 15 is an aberration chart for a zoom lens at a middle zoom position according to the fourth exemplary embodiment of the present invention.
Figure 16:
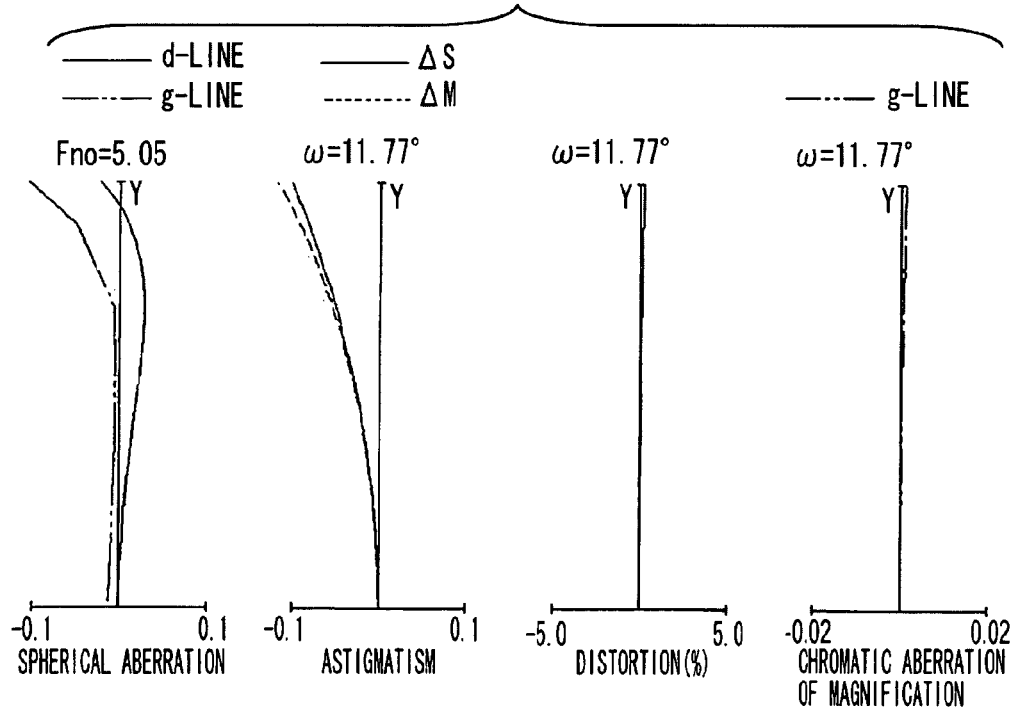
FIG. 16 is an aberration chart for a zoom lens at the telephoto end according to the fourth exemplary embodiment of the present invention.

FIG. 13 is a lens cross section of a zoom lens according to a fourth exemplary embodiment of the present invention. FIG. 14 is an aberration chart for the zoom lens at the wide-angle end according to the fourth exemplary embodiment of the present invention. FIG. 15 is an aberration chart for the zoom lens at a middle zoom position according to the fourth exemplary embodiment of the present invention. FIG. 16 is an aberration chart for the zoom lens at the telephoto end according to the fourth exemplary embodiment of the present invention. The fourth exemplary embodiment is a zoom lens having a zoom ratio of about 2.9 and an aperture ratio of about 2.8-5.0.

Figure 17:
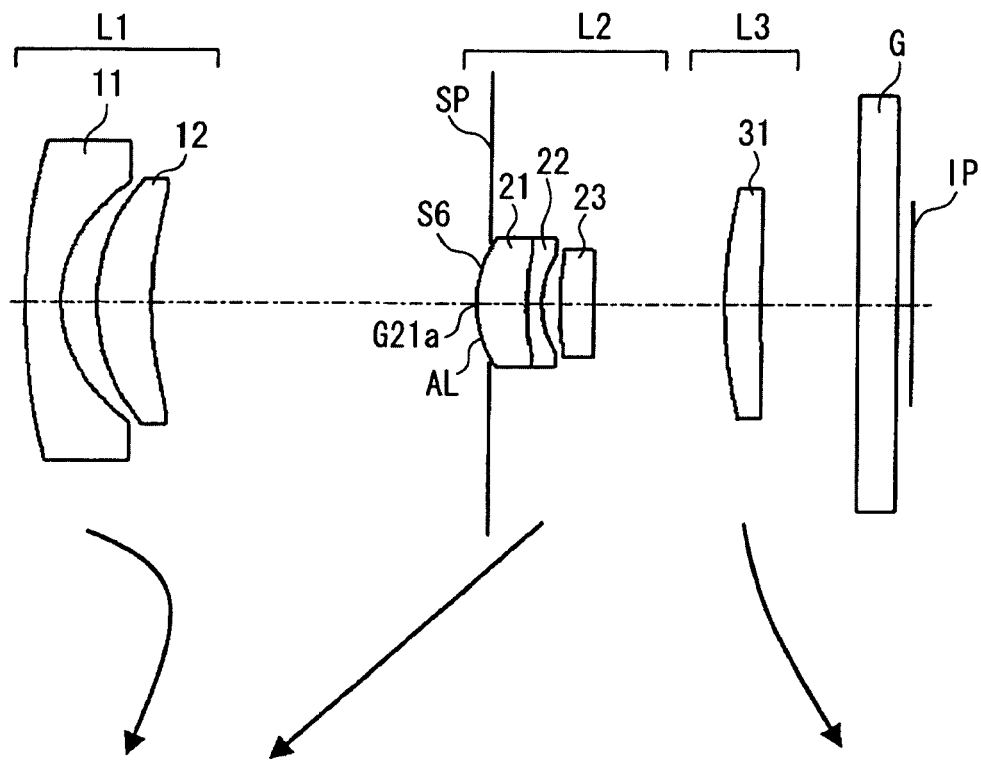
FIG. 17 is a lens cross section of a zoom lens according to a fifth exemplary embodiment of the present invention.
Figure 18:
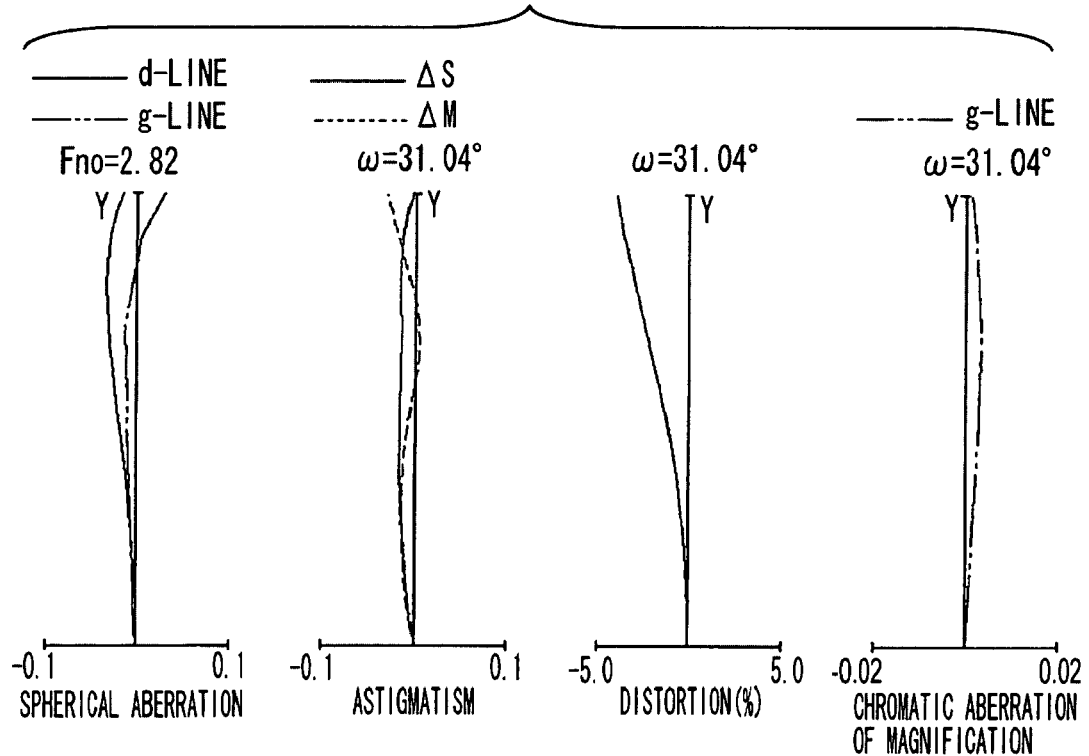
FIG. 18 is an aberration chart for a zoom lens at the wide-angle end according to the fifth exemplary embodiment of the present invention.
Figure 19:
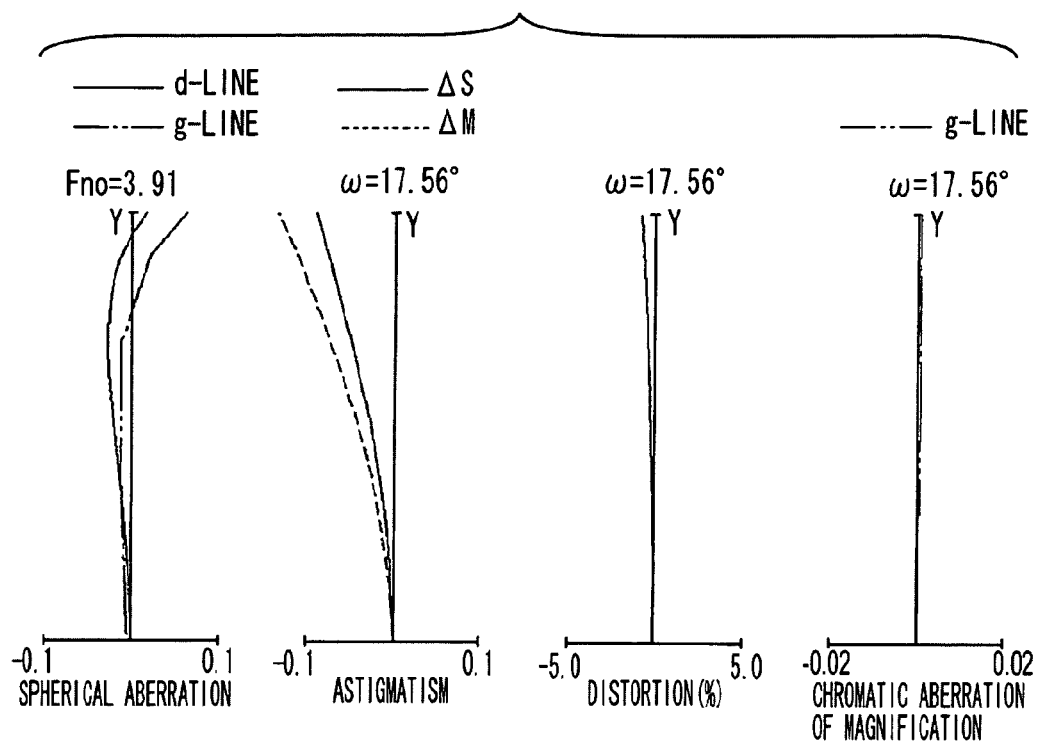
FIG. 19 is an aberration chart for a zoom lens at a middle zoom position according to the fifth exemplary embodiment of the present invention.
Figure 20:
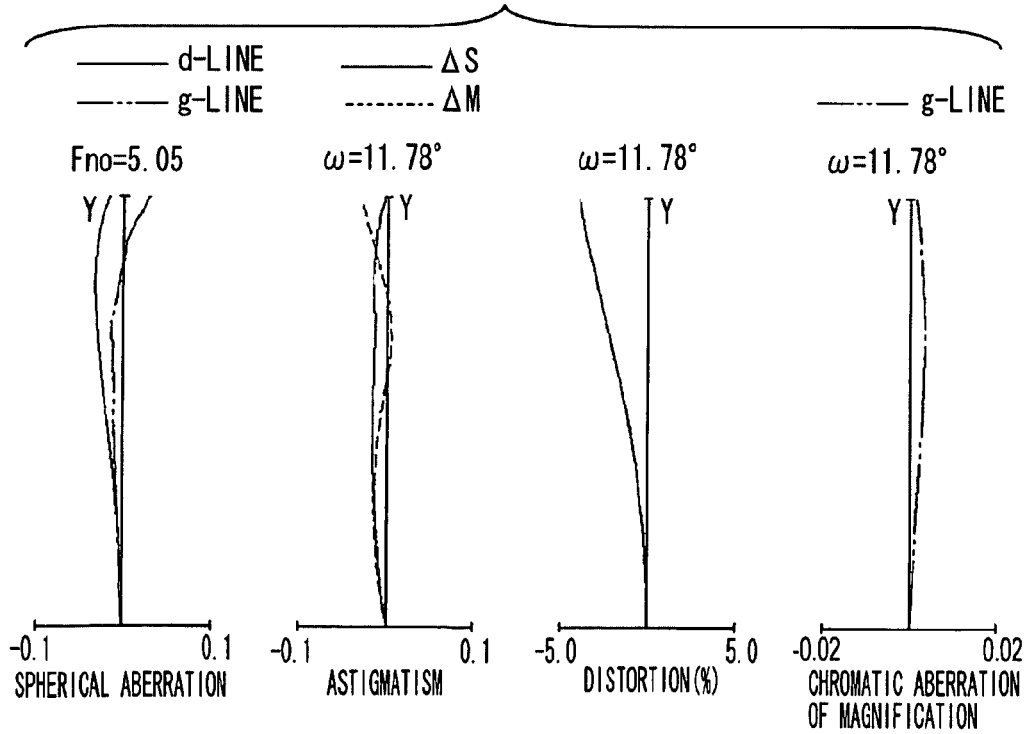
FIG. 20 is an aberration chart for a zoom lens at the telephoto end according to the fifth exemplary embodiment of the present invention.

FIG. 17 is a lens cross section of a zoom lens according to a fifth exemplary embodiment of the present invention. FIG. 18 is an aberration chart for the zoom lens at the wide-angle end according to the fifth exemplary embodiment of the present invention. FIG. 19 is an aberration chart for the zoom lens at a middle zoom position according to the fifth exemplary embodiment of the present invention. FIG. 20 is an aberration chart for the zoom lens at the telephoto end according to the fifth exemplary embodiment of the present invention. The fifth exemplary embodiment is a zoom lens having a zoom ratio of about 2.9 and an aperture ratio of about 2.8-5.1.

Figure 21:
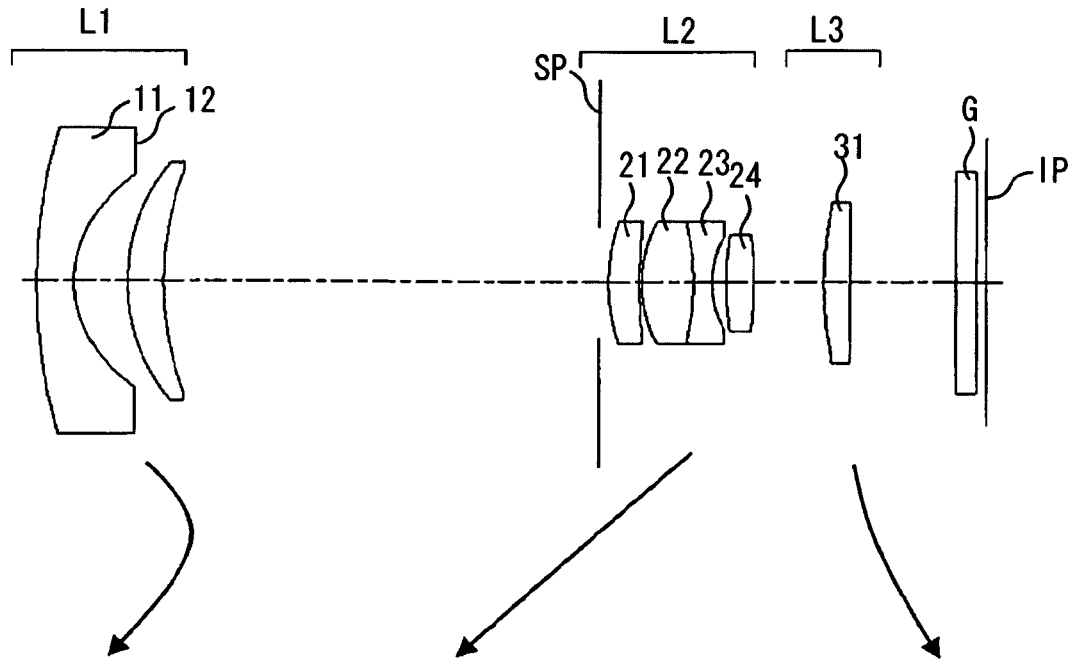
FIG. 21 is a lens cross section of a zoom lens according to a sixth exemplary embodiment of the present invention.
Figure 22:
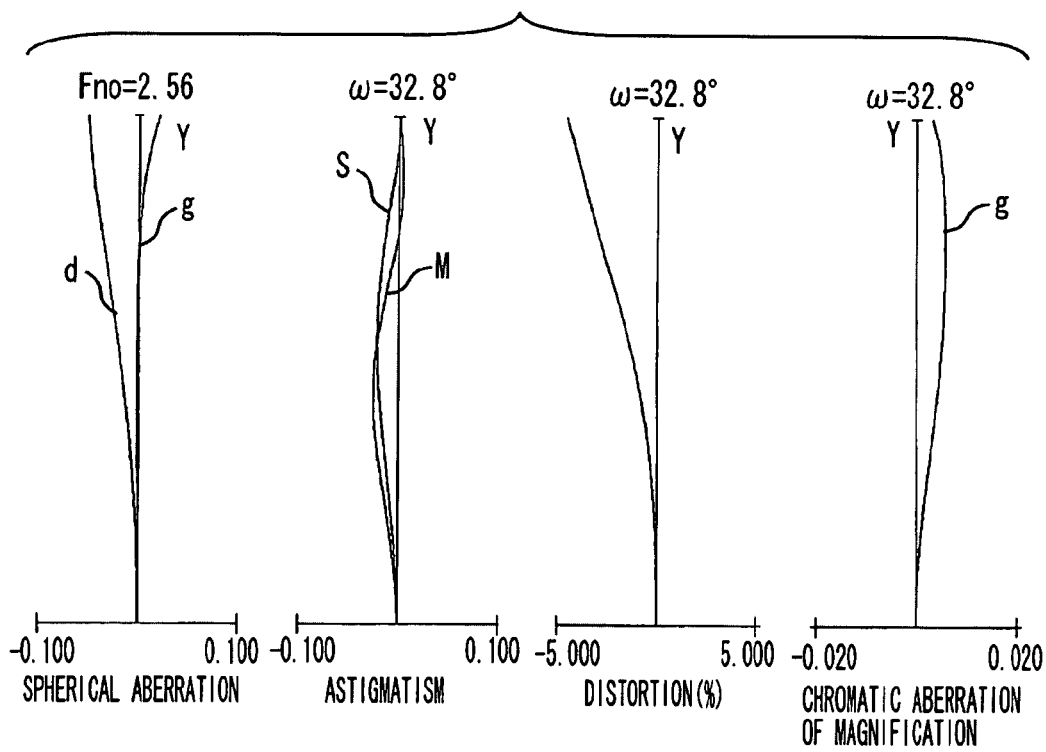
FIG. 22 is an aberration chart for a zoom lens at the wide-angle end according to the sixth exemplary embodiment of the present invention.
Figure 23:
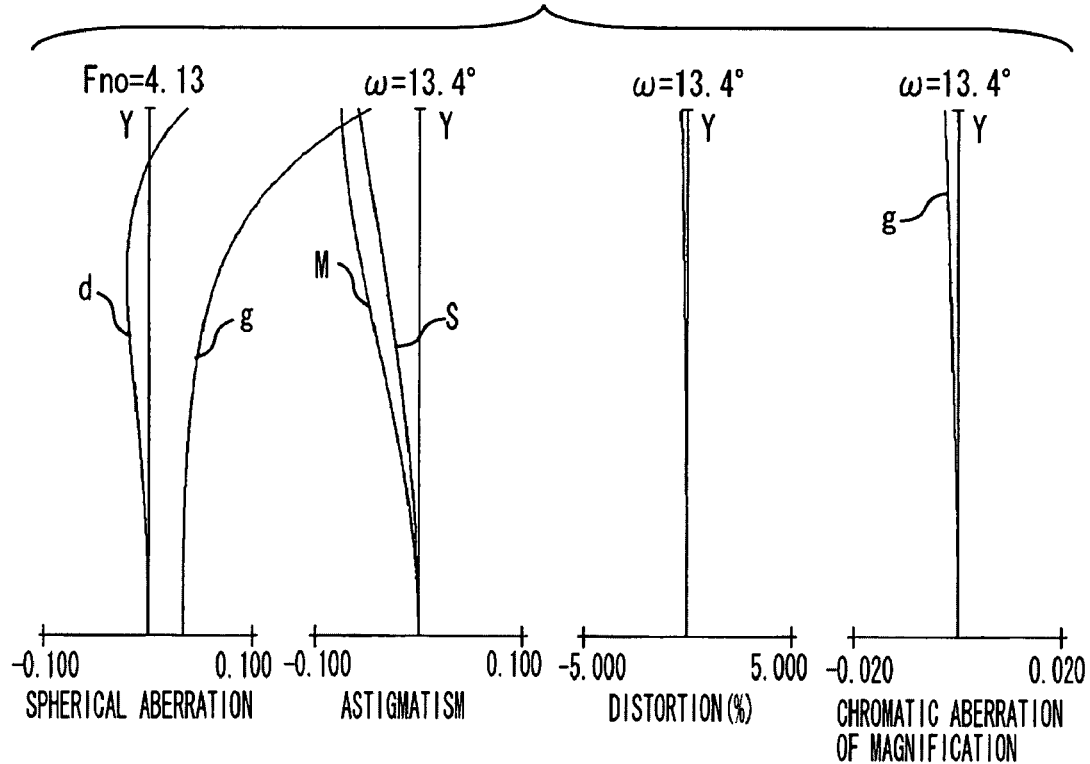
FIG. 23 is an aberration chart for a zoom lens at a middle zoom position according to the sixth exemplary embodiment of the present invention.
Figure 24:
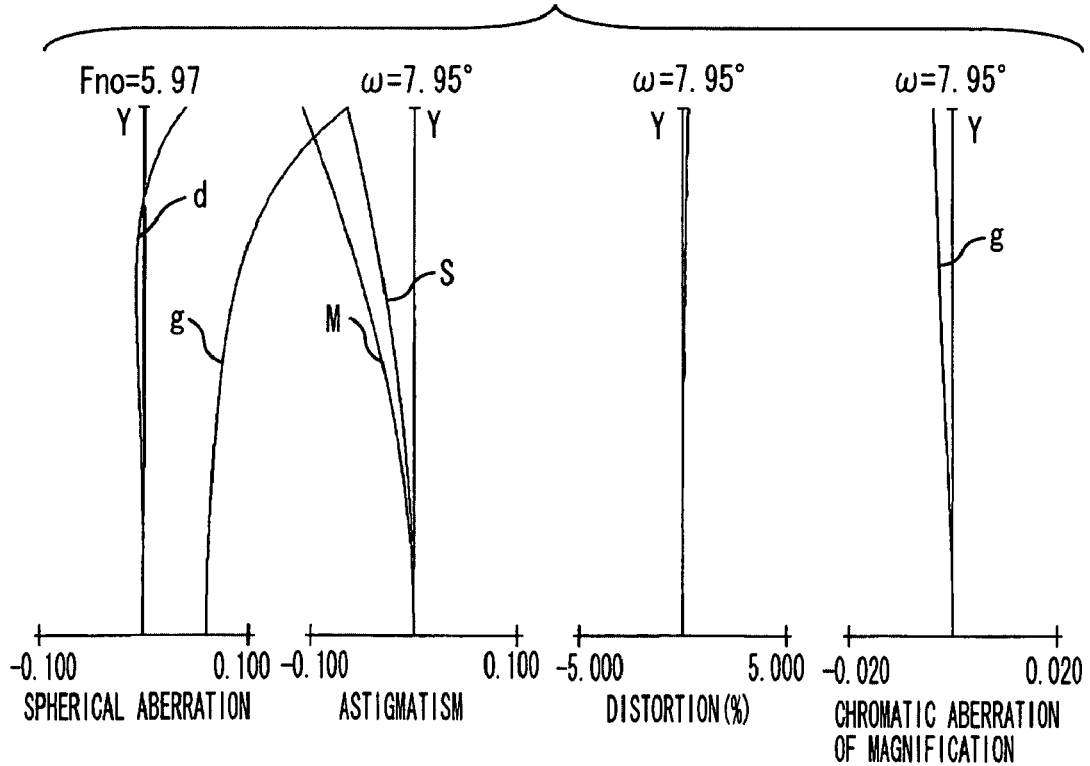
FIG. 24 is an aberration chart for a zoom lens at the telephoto end according to the sixth exemplary embodiment of the present invention.

FIG. 21 is a lens cross section of the zoom lens at the wide-angle end (short focal length end) according to the sixth exemplary embodiment of the present invention. FIG. 22 is an aberration chart for the zoom lens on wide-angle end according to the sixth exemplary embodiment of the present invention. FIG. 23 is an aberration chart for the zoom lens at a middle zoom position according to the sixth exemplary embodiment of the present invention. FIG. 24 is an aberration chart for the zoom lens at the telephoto end (long focal length end) according to the sixth exemplary embodiment of the present invention.

Figure 25:
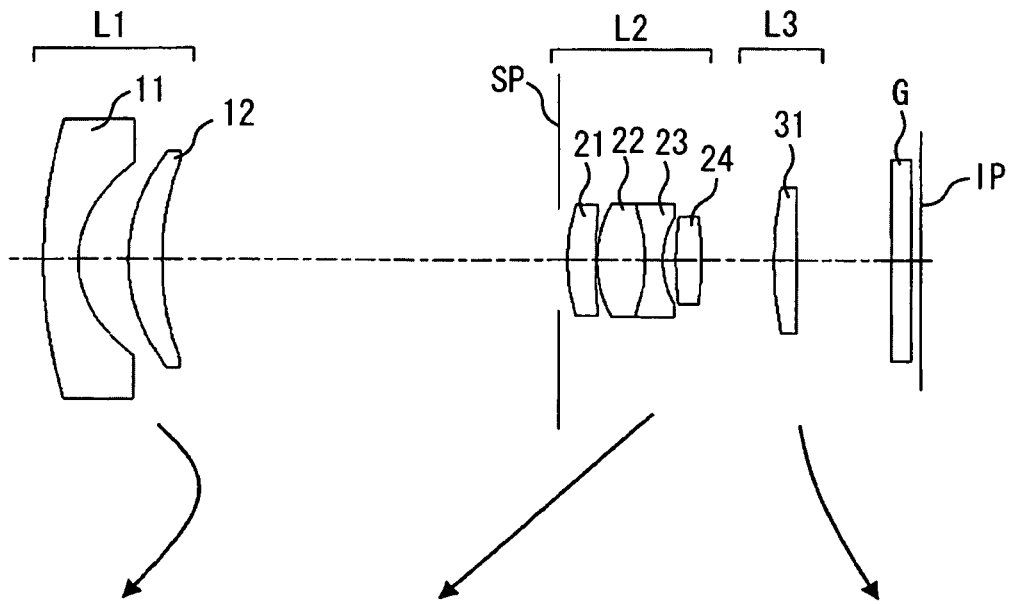
FIG. 25 is a lens cross section of a zoom lens according to a seventh exemplary embodiment of the present invention.
Figure 26:
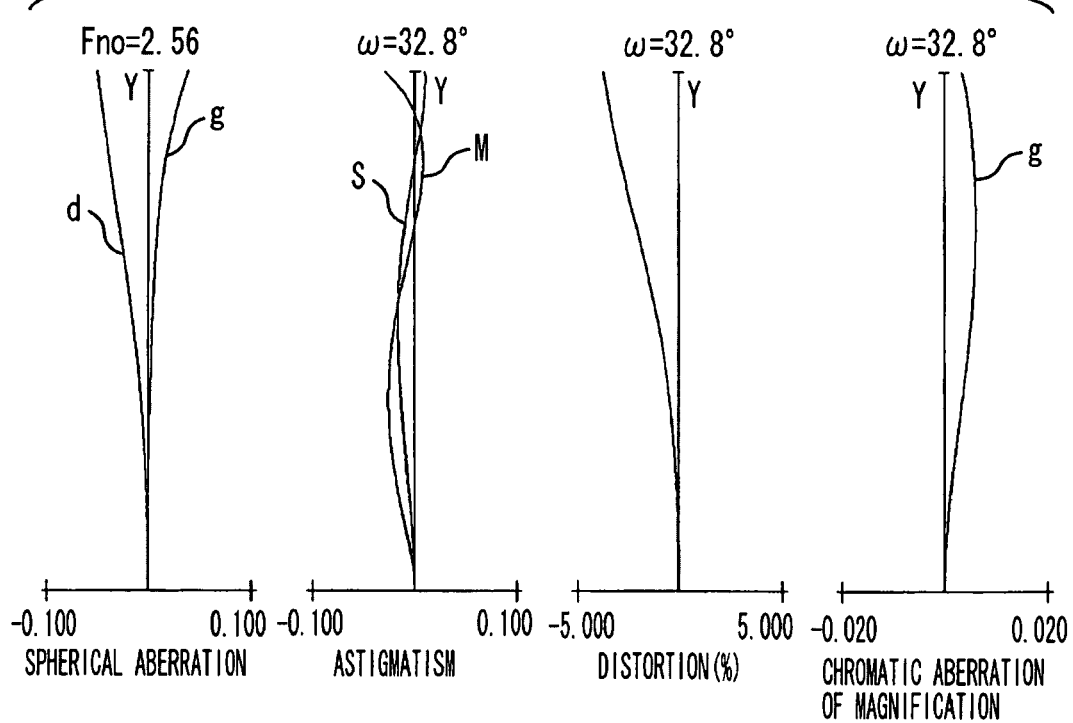
FIG. 26 is an aberration chart for a zoom lens at the wide-angle end according to the seventh exemplary embodiment of the present invention.
Figure 27:
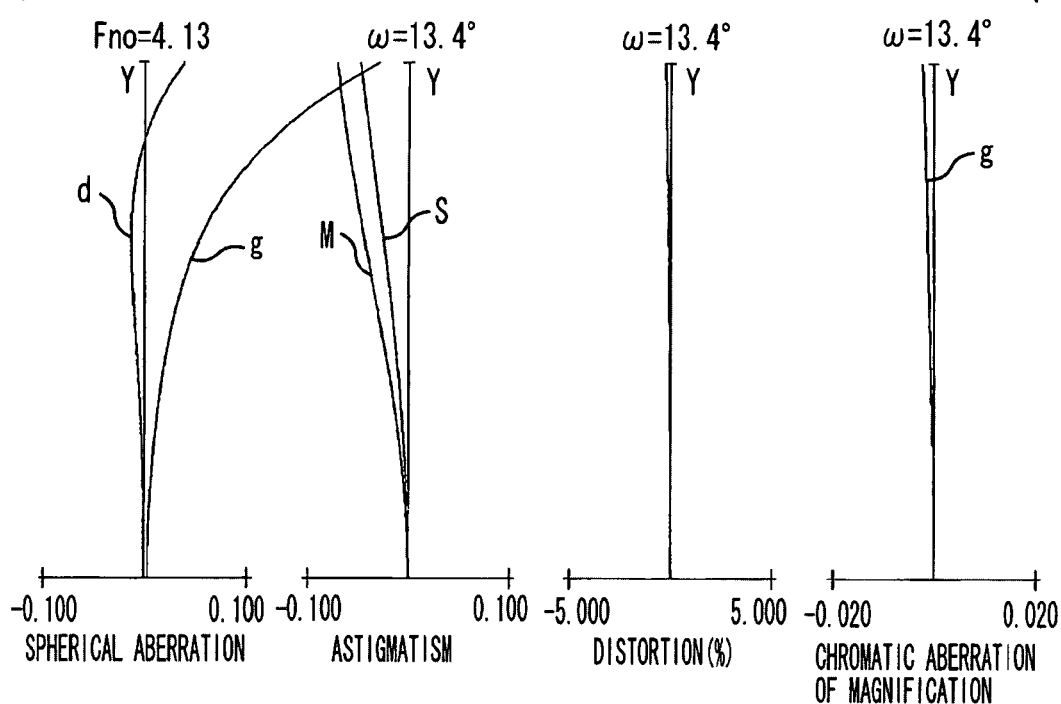
FIG. 27 is an aberration chart for a zoom lens at a middle zoom position according to the seventh exemplary embodiment of the present invention.
Figure 28:
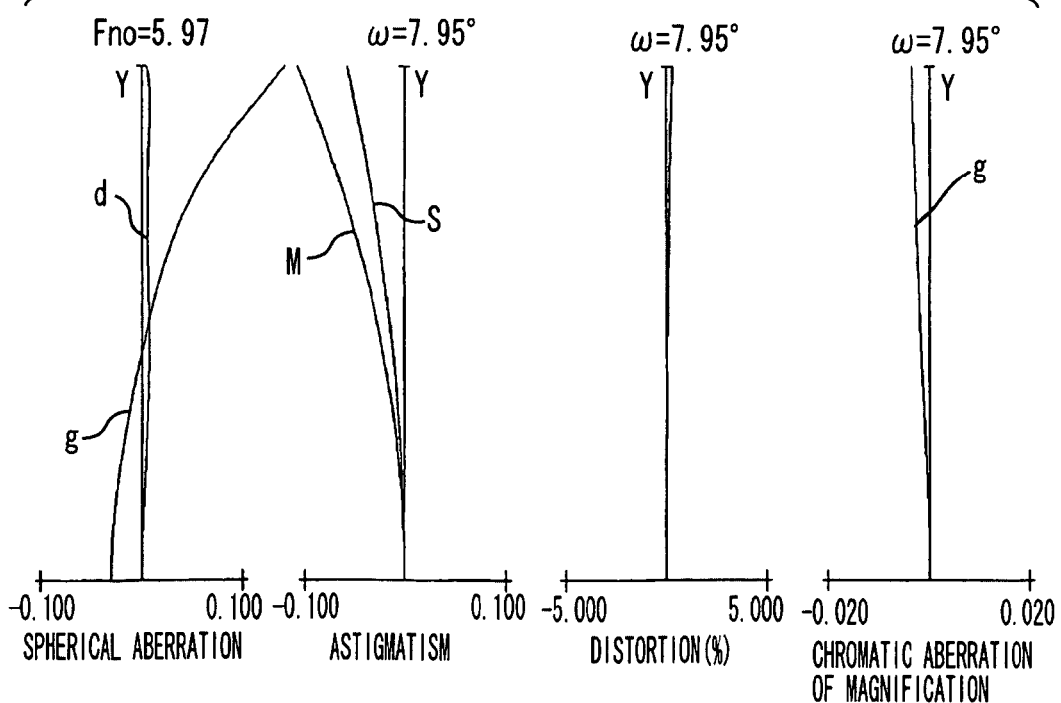
FIG. 28 is an aberration chart for a zoom lens at the telephoto end according to the seventh exemplary embodiment of the present invention.

FIG. 25 is a lens cross section of the zoom lens at the wide-angle end (short focal length end) according to the seventh exemplary embodiment of the present invention. FIG. 26 is an aberration chart for the zoom lens on wide-angle end according to the seventh exemplary embodiment of the present invention. FIG. 27 is an aberration chart for the zoom lens at a middle zoom position according to the seventh exemplary embodiment of the present invention. FIG. 28 is an aberration chart for the zoom lens at the telephoto end (long focal length end) according to the seventh exemplary embodiment of the present invention.

Figure 29:
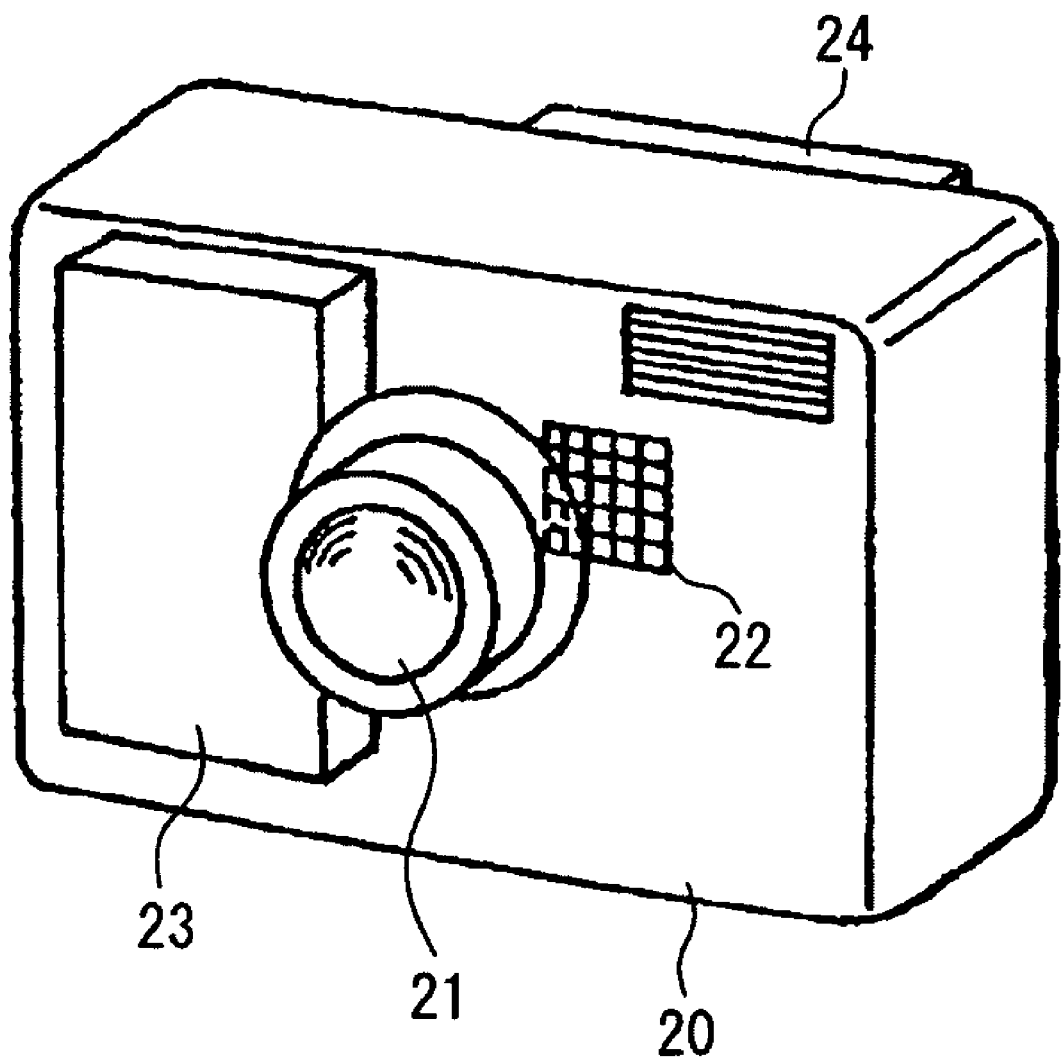
FIG. 29 illustrates main components of an image pickup apparatus according to an exemplary embodiment of the present invention.

FIG. 29 illustrates main components of a digital still camera (an image pickup apparatus) having the zoom lens according to an exemplary embodiment of the present invention.

The zoom lens according to each exemplary embodiment is a photographic lens system used in an image pickup apparatus. In each of the lens cross sections, the left portion thereof indicates an object side (front side) and the right portion thereof indicates an image side (rear side).

Furthermore, in each of the lens cross sections, "i" denotes the order of the lens units from the object side, "Li" denotes the i-th lens unit.

"L1" denotes the first lens unit (or the first unit) having a negative refractive power (optical power=a reciprocal of the focal length). "L2" denotes the second lens unit (or the second unit) having a positive refractive power. "L3" denotes the third lens unit (or the third unit) having a positive refractive power. "SP" denotes an aperture stop. The aperture stop SP determines (restricts) an axial F number (Fno) light flux during full aperture. "G" denotes a glass block, such as a crystal low-pass filter or an infrared cut-off filter.

"IP" denotes an image plane. In the case where the zoom lens is used as a photographic optical system of an image pickup apparatus, an imaging plane of a solid-state image sensor, such as a charge-coupled device (CCD) sensor or a complementary metal oxide semiconductor (CMOS) sensor, is located on the image plane IP.

In each of the aberration charts, "d" denotes d-line light. "g" denotes g-line light. "ΔM" denotes a meridional image plane. "ΔS" denotes a sagittal image plane. Chromatic aberration of magnification is indicated with g-line light. "ω" denotes a half angle of view. "Fno" denotes F-number. The Y-axis in the spherical aberration's graph is entrance pupil radius, and the Y-axis in the astigmatism's, distortion's, and chromatic aberration of magnification's graphs is image height.

In each of the following exemplary embodiments, the "wide-angle end" and the "telephoto end" each refer to a zoom position at which a magnifying lens unit is positioned at the end of a range in which the magnifying lens unit can mechanically move along the optical axis.

In the zoom lens according to each exemplary embodiment, the first lens unit L1 moves along a locus convex towards the image side during zooming from the wide-angle end to the telephoto end, the second lens unit L2 monotonically moves towards the object side, and the third lens unit L3 moves towards the image side. The zoom lens according to each exemplary embodiment performs main magnification by moving the second lens unit L2. The zoom lens according to each exemplary embodiment corrects positional variation of the image plane occurring due to the magnification by moving the first lens unit L1 along a convex locus and by moving the third lens unit L3 towards the image side. The third lens unit L3 particularly functions as a lens unit for increasing the refractive power of the entire lens system, which can be achieved by reducing the total size of the lens system.

Furthermore, the third lens unit L3 reduces the refractive power of a short zoom system constituted by the first lens unit L1 having a negative refractive power and the second lens unit L2 having a positive refractive power. Thus, the zoom lens according to each exemplary embodiment can particularly suppress or at least reduce aberrations occurring in the lens constituting the first lens unit L1 and achieve a high optical performance.

Furthermore, the third lens unit L3 also functions as a field lens. Accordingly, the zoom lens according to each exemplary embodiment can achieve telecentrically forming an image on the image side, which is necessary to be performed in an image pickup apparatus using a solid-state image sensor. Focusing from an infinitely distant object to a close object is performed by moving the third lens unit L3 towards the object side.

In each exemplary embodiment, the aperture stop SP is provided in the second lens unit on the object side or at a position in the vicinity thereof. Thus, the distance between an entrance pupil and the first lens unit L1 at the wide-angle end is reduced and, thus, an increase in an outer diameter of a lens constituting the first lens unit L1 can be prevented.

Furthermore, in each exemplary embodiment of the present invention, the first lens unit L1 and the third lens unit L3, which are disposed across the aperture stop SP, corrects various off-axis aberrations. Accordingly, the present invention can achieve a high optical performance without increasing the number of lenses.

In the zoom lens according to each exemplary embodiment of the present invention, in order to achieve a high optical performance while reducing the total size of the lens system, it is useful if at least one of the following conditions is satisfied.

A refractive index of a material of at least one positive lens G2P included in the second lens unit L2 (Nd2P), an Abbe number of a material of at least one positive lens G2P included in the second lens unit L2 (vd2P), where the positive lens G2P is disposed adjacent to a negative lens on the object side if the second lens unit L2 includes one negative lens while the positive lens G2P is disposed adjacent to a negative lens of the second lens unit L2 having the focal length shortest of negative lenses of the second lens unit L2 if the second lens unit L2 includes a plurality of negative lenses, a focal length of the positive lens G2P (f2P), a focal length of the second lens unit L2 (f2), a thickness of the positive lens G2P on an optical axis (2P), a thickness of a negative lens included in the second lens unit L2 having the focal length (focal length in the air) shortest of those of negative lenses constituting the second lens unit L2 (2N), a thickness of the entire second lens unit L2 on the optical axis (2D), where the third lens unit L3 is constituted by one positive lens G3P, a refractive index of a material of the positive lens G3P (Nd3P), an Abbe number of a material of the positive lens G3P (vd3P), a focal length of the third lens unit L3 (f3), a radius of curvature of a surface of the positive lens G3P on the object side (R31), an image-forming magnification of the third lens unit L3 at the wide-angle end (β3W), and an image-forming magnification of the third lens unit L3 at the telephoto end (β3T) can satisfy at least one of the following conditions:

$$Nd2P+0.01\times vd2P>2.3 \quad (1)$$

$$1.65<Nd2P<2.7 \quad (2)$$

$$vd2P>45 \quad (3)$$

$$0.37<f2P/f2<0.85 \quad (4)$$

$$0.40<(2P+2N)/2D<0.60 \quad (5)$$

$$Nd3P+0.01\times vd3P>2.3 \quad (6)$$

$$1.65<Nd3P<2.7 \quad (7)$$

$$vd3P>45 \quad (8)$$

$$0.7<R31/f3<1.0 \quad (9)$$

$$1.0<\beta3T/\beta3W<1.3 \quad (10).$$

Here, the above-described light transmissive ceramic can satisfy the conditions (1) through (3) and (6) through (8).

Here, it is premised that the zoom lens according to a first aspect of the present exemplary embodiment includes, in order from the object side to the image side, a first lens unit having a negative refractive power, a second lens unit having a positive refractive power, and a third lens unit having a positive refractive power. Furthermore, the zoom lens according to the first aspect of the present exemplary embodiment changes the intervals between adjacent ones of the lens units during zooming. In addition to having the above-described configuration as the premise, the zoom lens according to the first aspect of the present exemplary embodiment can satisfy the conditions (1) through (3). Note that it is more useful if the zoom lens according to the first aspect of the present exemplary embodiment can satisfy the conditions (4) and (5). However, it is not always required of the zoom lens according to the first aspect of the present exemplary embodiment to satisfy the conditions (4) and (5).

Furthermore, it is premised that the zoom lens according to a second aspect of the present exemplary embodiment includes, in order from the object side to the image side, a first lens unit having a negative refractive power, a second lens unit having a positive refractive power, and a third lens unit having a positive refractive power. The zoom lens according to the second aspect of the present exemplary embodiment changes the intervals between adjacent ones of the lens units during zooming. In addition to having the above-described configuration as the premise, the zoom lens according to the second aspect of the present exemplary embodiment performs focusing from an infinitely distant object to a close object by moving the third lens unit towards the object side (the third lens unit is moved during focusing). The third lens unit of the zoom lens according to the second aspect of the present exemplary embodiment is constituted by one positive lens.

Furthermore, the zoom lens according to the second aspect of the present exemplary embodiment satisfies the above-described conditions (6), (7), and (8). It is more useful if the zoom lens according to the second aspect of the present exemplary embodiment satisfies the above-described conditions (9) and (10). The usefulness of the zoom lens according to the second aspect of the present exemplary embodiment in this case will be described in detail below. In this regard, however, it is not always required of the zoom lens according to the second aspect of the present exemplary embodiment to satisfy the conditions (9) and (10).

Furthermore, with respect to the configuration of the third lens unit, which is constituted by one positive lens, the third lens unit can include a lens element having (substantially) no refractive power, such as a filter or a stop, as described above.

Now, a technical significance of each of the conditions (1) through (10) is described below. If the refractive index Nd2P of the material of the positive lens G2P becomes too high exceeding an upper limit value for the condition (2) in a range of the condition (1), then Petzval sum may be over-corrected.

On the other hand, if the refractive index Nd2P of the material of the positive lens G2P becomes too low exceeding a lower limit value for the condition (2) in a range of the condition (1), then Petzval sum may be under-corrected.

If the Abbe number vd2P of the material of the positive lens G2P becomes too small exceeding a lower limit value for the condition (3) in the range of the condition (1), then an absolute value of axial chromatic aberration may increase. In this case, it becomes difficult to effectively and appropriately correct Petzval sum and axial chromatic aberration at the same time.

If the focal length f2P of the positive lens G2P becomes too long exceeding an upper limit value for the condition (4), then Petzval sum may be under-corrected. On the other hand, if the focal length f2P becomes too short exceeding a lower limit value for the condition (4), then Petzval sum may be over-corrected.

If the thickness of the positive lens G2P and the negative lens of the second lens unit L2 on the optical axis becomes longer than that of the entire second lens unit L2 exceeding an upper limit value for the condition (5), then the thickness of the second lens unit L2 on the optical axis may become very thick. In this case, the total size of the second lens unit L2 may increase. In addition, in this case, spherical aberration is too under-corrected at the telephoto end to be effectively corrected.

On the other hand, if the thickness of the positive lens G2P and the negative lens of the second lens unit L2 on the optical axis becomes too small exceeding a lower limit value for the condition (5), then spherical aberration is over-corrected and it may become difficult to effectively and appropriately correct spherical aberration although the size of the second lens unit L2 can be reduced.

In each exemplary embodiment, the third lens unit L3 performs main focusing. Accordingly, if chromatic aberration varies when the third lens unit L3 is moved for focusing, it becomes difficult to obtain a high quality image. If the refractive index Nd3P of the material of the positive lens G3P becomes too high exceeding an upper limit value for the condition (7) in a range of the condition (6), then the total size of the lens system can be effectively reduced.

However, a glass material having such a high refractive index is not easily available. In addition, if the refractive index Nd3P becomes too low exceeding a lower limit value for the condition (7), then it becomes necessary to increase the thickness of the positive lens G3P to secure an edge portion. This is not useful because the total size of the lens system increases in this case.

If the Abbe number vd3P of the positive lens G3P becomes too small exceeding a lower limit value for the condition (8) in the range of the condition (6), then an absolute amount of chromatic aberration of magnification increases. In this case, an image forming performance may particularly degrade at the telephoto end. Furthermore, chromatic aberration of magnification may greatly vary when the third lens unit L3 is moved for focusing.

If the radius of curvature R31 becomes too large exceeding an upper limit value for the condition (9), then it becomes easy to provide a lens edge surface. In this case, the size of the third lens unit L3 can be effectively reduced. However, in the case where a CCD is used as an imaging unit, a light flux that has reflected on the surface of the CCD is then reflected on the surface of the third lens unit L3 on the object side and then turns back towards the image side. Then the light flux causes a phenomenon of ghost as a flare spot. Accordingly, it is not useful if the radius of curvature R31 becomes too large exceeding an upper limit value for the condition (9).

On the other hand, if the radius of curvature R31 becomes too small exceeding a lower limit value for the condition (9), then a lens edge portion cannot be obtained. In this case, the lens thickness may increase. Accordingly, in this case, the size of the third lens unit L3 may increase. Accordingly, it is not useful if the radius of curvature R31 becomes too small exceeding a lower limit value for the condition (9).

If the ratio of the image-forming magnification becomes too high exceeding an upper limit value for the condition (10), then the interval between the third lens unit L3 and the filter (glass block) G on the image side may become too small at the telephoto end to effectively correct defocusing occurring due to an error in assembling the lens. In addition, in this case, the third lens unit L3 may interfere with the filter. Accordingly, it is not useful if the ratio of the image-forming magnification becomes too high exceeding an upper limit value for the condition (10).

If the ratio of the image-forming magnification becomes too small exceeding a lower limit value for the condition (10), then the magnification assignment assigned to the third lens unit L3 may become too small during zooming from the wide-angle end to the telephoto end. In this case, it becomes necessary to secure an appropriate level of magnification ratio with the second lens unit L2.

In this case, the optical power of the second lens unit L2 may become too great or the amount of movement of the second lens unit L2 becomes great during zooming. As a result, it becomes difficult to reduce the total size of the lens system while maintaining a high optical performance.

In each exemplary embodiment, it is more useful to set the range of the values of the conditions (1) through (10) as follows to effectively correct aberration and to reduce the total size of the lens system:

$$3.3 > Nd2P + 0.01 \times vd2P > 2.3 \tag{1a}$$

$$1.70 < Nd2P < 2.6 \tag{2a}$$

$$80 > \nu d2P > 50 \quad (3a)$$

$$0.38 < f2P/f2 < 0.75 \quad (4a)$$

$$0.45 < (2P+2N)/2D < 0.55 \quad (5a)$$

$$3.3 > Nd3P + 0.01 \times \nu d3P > 2.3 \quad (6a)$$

$$1.70 < Nd3P < 2.6 \quad (7a)$$

$$80 > \nu d3P > 50 \quad (8a)$$

$$0.73 < R31/f3 < 0.95 \quad (9a)$$

$$1.05 < \beta 3T/\beta 3W < 1.2 \quad (10a).$$

Additionally, if the condition (4a) is modified as follows:

$$0.45 < f2P/f2 < 0.75 \quad (4b) \text{ or}$$

$$0.47 < f2P/f2 < 0.75 \quad (4c),$$

Petzval sum can be further reduced.

In each exemplary embodiment, a zoom lens suitable to an image pickup apparatus that uses a solid-state image sensor, whose number of lens components is small, and whose total size of the lens system is small can be achieved by setting each component as described above. By setting each component as described above, each exemplary embodiment can achieve a zoom lens useful as a retractable zoom lens, having a magnification ratio of about 2.9-4.6, and thus having a high optical performance.

Furthermore, according to each exemplary embodiment, an aspheric surface is effectively used in the first lens unit L1 and the second lens unit L2 to appropriately set the refractive power of the first lens unit L1 and the second lens unit L2. Accordingly, each exemplary embodiment can appropriately correct various off-axis aberrations, such as astigmatism and distortion, in particular. In addition, each exemplary embodiment can effectively correct spherical aberration that may occur in the case where a high aperture ratio is set.

Furthermore, a glass material in a specific range satisfying the condition (6) is used as the material of the positive lens G2P in the second lens unit L2. Accordingly, each exemplary embodiment can achieve a zoom lens whose optical performance may vary only slightly due to a change in the temperature, whose total size of the lens system is small, and thus having a high optical performance.

As described above, in each exemplary embodiment, a lens made of light transmissive ceramic is appropriately set in the second lens unit L2 and the third lens unit L3. Accordingly, each exemplary embodiment can achieve a zoom lens whose total size of the lens system is small, having a high zoom ratio, and having a high optical performance for the entire zoom range.

Now, a configuration of a lens in each lens unit according to each exemplary embodiment is described below.

The first lens unit L1 includes two lenses, namely, in order from the object side to the image side, a negative lens 11 having a meniscus shape whose surface on the object side has a convex shape, and a positive lens 12 having a meniscus shape whose surface on the image side has a concave shape.

The first lens unit L1 image-forms an off-axis principal ray around the aperture stop SP. The amount of refraction of the off-axis principal ray is large particularly at the wide-angle end. Accordingly, various off-axis aberrations, such as astigmatism and distortion, are easy to occur at the wide-angle end. In order to suppress or effectively correct off-axis aberrations, each exemplary embodiment includes a negative lens and a positive lens to prevent using a large-size lens as a lens located closest to the object side, similar to an ordinary lens system having a wide angle of view.

Furthermore, in each of the third, the fourth, and the fifth exemplary embodiments, a surface of the negative lens 11 on the object side has an aspheric shape, which intensifies the positive refractive index at a periphery of the lens. In addition, in each of the third, the fourth, and the fifth exemplary embodiments, a surface of the negative lens 11 on the image side has an aspheric shape, which reduces the negative refractive power at a periphery of the lens. Thus, both surfaces of the negative lens 11 are aspheric.

In the first, the second, the sixth, and the seventh exemplary embodiments, a surface of the negative lens 11 on the object side has aspherical shape. In addition, in each of the first, the second, the sixth, and the seventh exemplary embodiments, a surface of the negative lens 11 on the image side has an aspheric shape, which reduces the negative refractive power at a periphery of the lens. Thus, in the first, the second, the sixth, and the seventh exemplary embodiments, only one surface of the negative lens 11 (the surface on the object side) has an aspheric shape.

Accordingly, astigmatism and distortion can be balancedly corrected. Furthermore, according to each exemplary embodiment having the above-described configuration, the total size of the lens system can be easily reduced by using the first lens unit L1 having as small a number of lenses as two.

Furthermore, each lens constituting the first lens unit L1 has a shape substantially similar to a concentric sphere around a point of intersection of the aperture stop SP and the optical axis so as to suppress various off-axis aberrations that may occur due to the refraction of the off-axis principal ray. The second lens unit L2 includes at least one negative lens and is constituted by four or less lenses in total.

Furthermore, in exemplary embodiments, the following three types of lens configurations are employed as the lens configuration of the second lens unit L2.

[Type 1]

The lens configuration type 1 of the second lens unit L2 is equivalent to the first exemplary embodiment illustrated in FIG. 1, the second exemplary embodiment illustrated in FIG. 5, the sixth exemplary embodiment illustrated in FIG. 21, and the seventh exemplary embodiment illustrated in FIG. 25. In the lens configuration type 1 of the second lens unit L2, the second lens unit L2 includes four lenses in order from the object side to the image side, namely, a positive lens 21 whose surface on the object side has a convex shape, a positive lens 22 whose surface on the object side has a convex shape, a negative lens 23 whose surface on the image side has a concave shape, and a positive lens 24 both of whose surfaces have a convex shape.

In the first, the sixth, and the seventh exemplary embodiments, the positive lens 22 and the negative lens 23 are cemented with each other to form a cemented lens. In the second exemplary embodiment, all the lenses 21 to 24 are independent from one another.

In the second lens unit L2, two positive lenses, namely, the positive lens 21 and the positive lens 22, are disposed on the object side of the negative lens 23. With the above-described configuration, the angle of refraction of the off-axis ray that has exited the first lens unit L1 can be reduced. Furthermore, the positive lens 21 and the positive lens 22 sharedly serve to suppress off-axis aberration.

With respect to the two positive lenses 21 and 22, which are disposed on the object side of the negative lens 23, the height of the axial light flux passing therethrough is high. The positive lens 21 and the positive lens 22 primarily correct spherical aberration and coma. In this regard, in the present exemplary embodiment, the angle of incidence of the ray incident on the positive lens 22 is made gentle by the positive lens 21, which is located closest to the object side. In addition, the surface of the positive lens 22 on the object side has an aspheric shape (AL), which reduces the positive refractive index at a periphery thereof. With the above-described configuration, spherical aberration and coma can be effectively corrected.

Furthermore, the surface of the negative lens 23 on the image side has a shape concave towards the image side. Thus, the axial ray is deflected in a direction opposite the direction in which the positive lens 21 and the positive lens 22 deflect the axial ray. With the above-described configuration, spherical aberration occurring on the surface on the object side can be effectively corrected. The position of the concave surface of the negative lens 23 is significantly concerned with the occurrence and the degree of defocusing. In this regard, in order to set an optimal height of the ray incident on the concave surface of the negative lens 23, the present exemplary embodiment optimally sets the thickness of the positive lens 22 and the negative lens 23.

[Type 2]

The zoom lens having the second lens unit L2 of the type 2 lens configuration is equivalent to the third exemplary embodiment illustrated in FIG. 9. The second lens unit L2 according to the third exemplary embodiment includes four lenses in total, namely, in order from the object side to the image side, a cemented lens constituted by a positive lens 21 whose surface on the object side has a convex shape and a negative lens 22 whose surface on the image side has a concave shape and a cemented lens constituted by a negative lens 23 having a meniscus shape and whose surface on the object side has a convex shape and a positive lens 24 both of whose surfaces have a convex shape.

The second lens unit L2 includes the positive lens 21 located closest to the object side, which has a surface shape useful in reducing the angle of refraction of the off-axis ray that has exited the first lens unit L1 and suppressing off-axis aberration.

Furthermore, with respect to the positive lens 21, which is located closest to the object side, the height of the axial light flux passing therethrough is highest of those of the four lenses. The positive lens 21 primarily corrects spherical aberration and coma. In this regard, in the third exemplary embodiment, the object side surface of the positive lens 21, which is located closest to the object side, has an aspheric shape (AL), which reduces the positive refractive index at a periphery of the lens. With the above-described configuration, the present exemplary embodiment can effectively correct spherical aberration and coma.

Furthermore, the surface of the negative lens 22 on the image side has a shape concave towards the image side to exert an effect of deflecting the axial ray in a direction opposite the direction in which the positive lens 21 deflects the axial ray. Thus, spherical aberration that may occur on the surface on the object side can be effectively corrected. In addition, the second lens unit L2 having the lens configuration type 2 includes a cemented lens constituted by the negative lens 23 and the positive lens 24. Thus, axial chromatic aberration and chromatic aberration of magnification can be effectively corrected. The position of the concave surface of the negative lens 22 is significantly concerned with the occurrence and the degree of defocusing. In this regard, in order to set an optimal height of the ray incident on the concave surface of the negative lens 22, the present exemplary embodiment optimally sets the thickness of the positive lens 21 and the negative lens 22.

[Type 3]

The zoom lens having the second lens unit L2 of the type 3 lens configuration is equivalent to the fourth exemplary embodiment illustrated in FIG. 13 and the fifth exemplary embodiment illustrated in FIG. 17. Each of the fourth exemplary embodiment and the fifth exemplary embodiment includes three lenses in total, namely, in order from the object side to the image side, a positive lens 21 whose surface on the object side has a convex shape, a negative lens 22 whose surface on the image side has a concave shape, and a positive lens 23 both of whose surfaces have a convex shape. The fifth exemplary embodiment includes a cemented lens constituted by the positive lens 21 and the negative lens 22. In the fourth exemplary embodiment, all the lenses 21 to 23 are independent from one another.

The second lens unit L2 includes the positive lens 21 located closest to the object side, which has a surface shape useful in reducing the angle of refraction of the off-axis ray that has exited the first lens unit L1 and suppressing off-axis aberration.

Furthermore, with respect to the positive lens 21, which is located closest to the object side, the height of the axial light flux passing therethrough is highest of those of the three lenses. The positive lens 21 primarily corrects spherical aberration and coma. In this regard, in each of the fourth and the fifth exemplary embodiments, the object side surface of the positive lens 21, which is located closest to the object side, has an aspheric shape (AL), which reduces the positive refractive index at a periphery of the lens. With the above-described configuration, the present exemplary embodiment can effectively correct spherical aberration and coma.

Furthermore, the surface of the negative lens 22 on the image side has a shape concave towards the image side to exert an effect of deflecting the axial ray in a direction opposite the direction in which the positive lens 21 deflects the axial ray. Thus, spherical aberration that may occur on the surface on the object side can be effectively corrected.

The position of the concave surface of the negative lens 22 is significantly concerned with the occurrence and the degree of defocusing. In this regard, in order to set an optimal height of the ray incident on the concave surface of the negative lens 22, the present exemplary embodiment optimally sets the thickness of the positive lens 21 and the negative lens 22.

Here, in the first, the sixth, and the seventh exemplary embodiments, the positive lens 22 of the second lens unit L2, which is located the second from the object side, satisfies the above-described conditions (1) through (3). In the first exemplary embodiment, the positive lens 22 is made of light transmissive ceramic.

In the second exemplary embodiment, the positive lens 22 of the second lens unit L2, which is located the second from the object side, and the positive lens 24 of the second lens unit L2, which is located the fourth from the object side, satisfy the conditions (1) through (3). In the second exemplary embodiment, the positive lens 22 and the positive lens 24 are made of light transmissive ceramic.

In the third exemplary embodiment, the positive lens 21 of the second lens unit L2 located closest to the object side and the positive lens 24, which is located the fourth from the object side (located closest to the image side), satisfy the conditions (1) through (3). In the third exemplary embodiment, the positive lens 22 and the positive lens 24 are made of light transmissive ceramic.

In the fourth exemplary embodiment, the positive lens 21 of the second lens unit L2 located closest to the object side and the positive lens 23, which is located the third from the object side (located closest to the image side), satisfy the conditions (1) through (3). Here, the positive lens 21 and the positive lens 23 are made of light transmissive ceramic.

In the fifth exemplary embodiment, the positive lens 21 of the second lens unit L2 located closest to the object side and the positive lens 23, which is located the third from the object side (located closest to the image side), satisfy the conditions (1) through (3). Here, the positive lens 21 and the positive lens 23 are made of light transmissive ceramic.

Now, a lens configuration of the third lens unit L3 is described in detail below. In each exemplary embodiment, the third lens unit L3 is constituted by a positive lens 31 whose surface on the object side has a convex shape. The third lens unit L3 functions as a field lens to telecentrically form an image on the image side. The positive lens 31 satisfies the above-described conditions (6) through (8). The positive lens 31 is made of light transmissive ceramic.

Here, a back focus (sk'), a focal length of the third lens unit L3 (f3), and an image-forming magnification of the third lens unit L3 (β3) can satisfy the following condition:

$$sk' = f3(1-\beta 3)$$

where $$0 < \beta 3 < 1.0.$$

Here, the back focus sk' decreases when the third lens unit L3 is moved towards the image side during zooming from the wide-angle end to the telephoto end. In this case, the image-forming magnification β3 of the third lens unit L3 increases on the telephoto side.

As a result, the variable magnification can be sharedly performed with the third lens unit L3. Accordingly, in this case, the amount of movement of the second lens unit L2 during zooming can be reduced.

By reducing the amount of movement of the second lens unit L2 during zooming in the above-described manner, the space in the lens system can be saved. Accordingly, the total size of the zoom lens can be easily reduced.

In the case of shooting a close object by using the zoom lens according to each exemplary embodiment, a high optical performance can be achieved by moving the first lens unit L1 towards the object side. Here, it is more useful to move the third lens unit L3 towards the object side.

It is useful to move the third lens unit L3 towards the object side in suppressing an increase in the size of a front lens that may occur during focusing by moving the first lens unit L1 located closest to the object side and in suppressing an increase in the load on an actuator that may occur by moving the first lens unit L1, whose lens total weight is highest of all the lens units.

In addition, according to each exemplary embodiment, the first lens unit L1 and the second lens unit L2 can be moved during zooming in simple cooperation by using a cam. Accordingly, the mechanical configuration of the zoom lens can be simplified and the accuracy in manufacturing the zoom lens can be improved.

Furthermore, in the case of focusing with the third lens unit L3, a space of moving larger than that at the wide-angle end can be secured at the telephoto end, on which the moving amount during focusing is large, by moving the third lens unit L3 during zooming from the wide-angle end to the telephoto end.

Accordingly, the total moving amount of moving the third lens unit L3, which is necessary for zooming and focusing, can be reduced to a minimum and, thus, the total size of the lens system can be easily reduced.

Note that in each exemplary embodiment, it is also useful if two lens units (for example, the first lens unit L1 and the second lens unit L2, the first lens unit L1 and the third lens unit L3, or the second lens unit L2 and the third lens unit L3) are moved to change the intervals between adjacent ones of the lens units instead of moving three lens units during zooming.

Furthermore, it is also useful to add another lens unit having a low refractive power on the object side of the first lens unit L1 or on the image side of the third lens unit L3.

Now, numerical examples 1 through 7 respectively corresponding to the first through the seventh exemplary embodiments are described.

In each of numerical example 1 through 7, "i" denotes the order of a surface from the object side. "ri" denotes a curvature of field of the i-th lens surface. "di" denotes a lens thickness and an air interval between the i-th surface and the (i+1)-th surface. "ndi" denotes a refractive index of the i-th medium with respect to d-line light. "vdi" denotes an Abbe number of the i-th medium with respect to d-line light.

Furthermore, two surfaces of the lens located closest to the image side is made of a glass material, such as a face plate. In addition, each of "k", "B", "C", "D", and "E" denotes an aspheric coefficient.

The aspheric shape can be expressed by the following expression:

$$X = (h^2/R) / \left[ 1 + \{1 - (1+k)(h/R)^2\}^{1/2} \right] + Bh^4 + Ch^6 + Dh^8 + Eh^{10} + Fh^{12}$$

where "x" denotes a displacement from a surface vertex along the optical axis at a position with a height "h" from the optical axis, and "R" denotes a radius of curvature. "E-Z" denotes "$10^{-Z}$".

In each of the following numerical examples 3 through 5, d5 has a negative value. This is because the order of the components is counted in order of the F number determination member (aperture stop) SP, the positive lens 21, and the like from the object side to the image side.

More specifically, as illustrated in FIGS. 9, 13, and 17, the F number determination member (aperture stop) SP is located closer to the image side than the position of a vertex G21a on the object side of the lens surface (S6) of the positive lens 21 of the second lens unit L2 by a distance equivalent to an absolute value of d5.

In addition, the relationship between each of the conditions (1) through (10) described above and each exemplary embodiment is set forth in Table 1.

Numerical Example 1

| Unit: mm | | | | |
|---|---|---|---|---|
| Surface Data | | | | |
| | | | | Effective diameter |
| Object Side | ∞ | ∞ | | |
| r1 = 27.325 | d1 = 1.80 | nd1 = 1.882997 | vd1 = 40.8 | 13.957 |
| r2* = 5.353 | d2 = 2.69 | | | 10.373 |

-continued

Unit: mm

| | | | | |
|---|---|---|---|---|
| r3 = 9.464 | d3 = 1.75 | nd2 = 1.922860 | vd2 = 18.9 | 10.591 |
| r4 = 15.890 | d4 = Variable | | | 10.074 |
| r5 (Stop) | d5 = 0.40 | | | 5.306 |
| r6 = 9.634 | d6 = 1.50 | nd3 = 1.487490 | vd3 = 70.2 | 5.528 |
| r7 = 40.425 | d7 = 0.10 | | | 5.508 |
| r8* = 6.412 | d8 = 2.50 | nd4 = 1.830000 | vd4 = 59.0 | 5.534 |
| r9 = −25.348 | d9 = 0.85 | nd5 = 1.806100 | vd5 = 33.3 | 4.853 |
| r10 = 4.640 | d10 = 0.70 | | | 4.269 |
| r11 = 19.974 | d11 = 1.30 | nd6 = 1.531717 | vd6 = 48.8 | 4.300 |
| r12 = −18.865 | d12 = Variable | | | 4.292 |
| r13 = 22.455 | d13 = 1.20 | nd7 = 1.830000 | vd7 = 59.0 | 7.191 |
| r14 = −216.299 | d14 = Variable | | | 7.125 |
| r15 = ∞ | d15 = 1.00 | nd8 = 1.516330 | vd8 = 64.1 | 10.000 |
| r16 = ∞ | | | | 10.000 |

Aspheric Coefficients

| | | | |
|---|---|---|---|
| r2 | k = −1.66903e+00 | B = 8.82464e−04 | C = 8.83090e−07 |
| | D = −5.66131e−08 | E = 1.40747e−09 | |
| r8 | k = −2.96947e−01 | B = −3.00436e−05 | |

Various Data
Zoom ratio: 4.60554

| | Wide-Angle End | Middle Zoom Positions | Telephoto End |
|---|---|---|---|
| Focal length | 4.69000 | 12.67555 | 21.60000 |
| F number | 2.55697 | 4.12754 | 5.97401 |
| Angle of view | 32.75683 | 13.39046 | 7.95270 |
| Image height | 3.01750 | 3.01750 | 3.01750 |
| Total lens length | 38.92153 | 34.18398 | 42.26604 |
| BF | 6.21523 | 5.74468 | 4.40463 |
| d4 | 20.76316 | 5.31168 | 1.81031 |
| d12 | 3.36712 | 14.08205 | 25.66548 |
| d14 | 5.05574 | 4.58519 | 3.24514 |
| Entrance pupil position | 9.11610 | 5.99229 | 4.58283 |
| Exit pupil position | −12.46714 | −79.22474 | 129.18341 |
| Front principal point position | 12.62874 | 16.77693 | 29.92193 |
| Rear principal point position | 1.52523 | −6.93087 | −17.19537 |

Single Lens Data

| Lens | First Surface | Focal Length |
|---|---|---|
| 1 | 1 | −7.84021 |
| 2 | 3 | 22.42661 |
| 3 | 6 | 25.53729 |
| 4 | 8 | 6.39373 |
| 5 | 9 | −4.80479 |
| 6 | 11 | 18.46049 |
| 7 | 13 | 24.56550 |

Zoom Lens Unit Data

| Lens unit | First surface | Focal length | Lens component length | Front principal point position | Rear principal point position |
|---|---|---|---|---|---|
| 1 | 1 | −13.19670 | 6.24025 | 0.49329 | −4.11563 |
| 2 | 5 | 12.25071 | 7.35000 | −0.91068 | −5.42150 |
| 3 | 13 | 24.56550 | 1.20000 | 0.06181 | −0.59542 |

Numerical Example 2

Unit: mm

Surface Data

| | | | | | Effective diameter |
|---|---|---|---|---|---|
| Object Side | ∞ | ∞ | | | |
| r1 = 25.755 | d1 = 1.80 | nd1 = 1.882997 | vd1 = 40.8 | | 15.603 |
| r2* = 6.100 | d2 = 3.21 | | | | 11.702 |
| r3 = 10.149 | d3 = 1.75 | nd2 = 1.922860 | vd2 = 18.9 | | 11.846 |
| r4 = 14.786 | d4 = Variable | | | | 11.259 |
| r5 (Stop) | d5 = 0.40 | | | | 5.178 |
| r6 = 8.357 | d6 = 1.50 | nd3 = 1.487490 | vd3 = 70.2 | | 5.387 |
| r7 = 46.396 | d7 = 0.10 | | | | 5.317 |
| r8* = 6.844 | d8 = 2.50 | nd4 = 1.830000 | vd4 = 59.0 | | 5.296 |
| r9 = −15.990 | d9 = 0.15 | | | | 4.589 |
| r10 = −11.679 | d10 = 1.05 | nd5 = 1.834000 | vd5 = 37.2 | | 4.479 |
| r11 = 4.846 | d11 = 0.70 | | | | 3.914 |
| r12 = 29.450 | d12 = 1.30 | nd6 = 1.830000 | vd6 = 59.0 | | 3.953 |
| r13 = −24.852 | d13 = Variable | | | | 3.950 |
| r14 = 18.994 | d14 = 1.20 | nd7 = 1.830000 | vd7 = 59.0 | | 7.062 |
| r15 = 1030.417 | d15 = Variable | | | | 7.175 |
| r16 = ∞ | d16 = 1.00 | nd8 = 1.516330 | vd8 = 64.1 | | 10.000 |
| r17 = ∞ | | | | | 10.000 |

Aspheric Coefficients

| | | | |
|---|---|---|---|
| r2 | k = −2.18448e+00 | B = 8.84631e−04 | C = −2.99072e−06 |
| | D = −7.35680e−10 | E = 8.07336e−10 | |
| r8 | k = 4.13290e−01 | B = −2.07296e−04 | |

Various Data
Zoom ratio: 4.60554

| | Wide-Angle End | Middle Zoom Positions | Telephoto End |
|---|---|---|---|
| Focal length | 4.69000 | 12.63504 | 21.60000 |
| F number | 2.63625 | 4.15897 | 5.97401 |
| Angle of view | 32.75683 | 13.39046 | 7.95270 |
| Image height | 3.01750 | 3.01750 | 3.01750 |
| Total lens length | 43.02605 | 34.67939 | 41.06544 |
| BF | 5.44327 | 4.97026 | 3.57156 |
| d4 | 23.79970 | 5.93020 | 1.86773 |
| d13 | 3.56156 | 13.08414 | 23.53292 |
| d15 | 4.82378 | 3.81077 | 2.41208 |
| Entrance pupil position | 10.39188 | 6.76769 | 5.08325 |
| Exit pupil position | −13.01461 | −72.48883 | 137.16321 |
| Front principal point position | 13.89019 | 17.34172 | 30.17568 |
| Rear principal point position | 0.753268 | −7.664784 | −18.02844 |

Single Lens Data

| Lens | First Surface | Focal Length |
|---|---|---|
| 1 | 1 | −9.45926 |
| 2 | 3 | 29.68813 |
| 3 | 6 | 20.64296 |
| 4 | 8 | 6.07611 |
| 5 | 10 | −3.99143 |
| 6 | 12 | 16.41701 |
| 7 | 14 | 23.30120 |

-continued

Unit: mm

Zoom Lens Unit Data

| Lens unit | First surface | Focal length | Lens component length | Front principal point position | Rear principal point position |
|---|---|---|---|---|---|
| 1 | 1 | −14.77228 | 6.76479 | 0.70257 | −4.35967 |
| 2 | 5 | 12.43159 | 7.70000 | −1.61290 | −5.94891 |
| 3 | 14 | 23.30120 | 1.20000 | −0.01231 | −0.66769 |

Numerical Example 3

Unit: mm

Surface Data

|  |  |  |  | Effective diameter |
|---|---|---|---|---|
| Object Side | ∞ | ∞ |  |  |
| r1* = 65.809 | d1 = 1.55 | nd1 = 1.901355 | vd1 = 31.6 | 15.883 |
| r2* = 6.469 | d2 = 2.13 |  |  | 12.231 |
| r3 = 11.628 | d3 = 1.80 | nd2 = 2.100000 | vd2 = 17.0 | 12.335 |
| r4 = 25.073 | d4 = Variable |  |  | 11.913 |
| r5 (Stop) | d5 = −0.50 |  |  | 5.027 |
| r6* = 5.919 | d6 = 2.75 | nd3 = 1.830000 | vd3 = 59.0 | 5.033 |
| r7 = 26.130 | d7 = 0.65 | nd4 = 1.733997 | vd4 = 51.5 | 4.326 |
| r8 = 5.024 | d8 = 1.33 |  |  | 4.049 |
| r9 = 24.282 | d9 = 0.60 | nd5 = 1.922864 | vd5 = 21.3 | 4.200 |
| r10 = 8.240 | d10 = 1.60 | nd6 = 1.830000 | vd6 = 59.0 | 4.283 |
| r11 = −21.160 | d11 = Variable |  |  | 4.778 |
| r12 = 15.952 | d12 = 1.75 | nd7 = 1.830000 | vd7 = 59.0 | 11.497 |
| r13 = 171.400 | d13 = Variable |  |  | 11.335 |
| r14 = ∞ | d14 = 1.30 | nd8 = 1.516330 | vd8 = 64.1 | 15.000 |
| r15 = ∞ |  |  |  | 15.000 |

Aspheric Coefficients

| r1 | k = −2.98536e+01 | B = 4.54933e−05 | C = −2.77291e−07 |
|---|---|---|---|
|  | D = −1.03539e−09 | E = 1.05764e−11 |  |
| r2 | k = −1.41184e+00 | B = 3.65801e−04 | C = −1.83309e−07 |
|  | D = 1.55680e−09 | E = −2.81133e−10 |  |
| r6 | k = −4.20003e−01 | B = 3.30837e−06 | C = −1.08990e−06 |
|  | D = 1.75861e−07 |  |  |

Various Data
Zoom ratio: 3.52394

|  | Wide-Angle End | Middle Zoom Positions | Telephoto End |
|---|---|---|---|
| Focal length | 6.30000 | 13.80676 | 22.20083 |
| F number | 2.89999 | 4.37269 | 5.93500 |
| Angle of view | 36.28340 | 18.51987 | 11.76786 |
| Image height | 4.62500 | 4.62500 | 4.62500 |
| Total lens length | 37.32083 | 35.63808 | 40.88175 |
| BF | 5.81187 | 4.53571 | 4.09681 |
| d4 | 17.31788 | 5.25253 | 0.95087 |
| d11 | 6.34627 | 16.72887 | 26.27421 |
| d13 | 4.45454 | 3.17838 | 2.73948 |
| Entrance pupil position | 9.04874 | 5.73481 | 3.66013 |
| Exit pupil position | −23.07911 | 6159.0745 | 66.251722 |
| Front principal point position | 13.974959 | 19.572534 | 33.79078 |
| Rear principal point position | −0.488129 | −9.271046 | −18.10402 |

-continued

Unit: mm

Single Lens Data

| Lens | First Surface | Focal Length |
|---|---|---|
| 1 | 1 | −8.05948 |
| 2 | 3 | 18.42181 |
| 3 | 6 | 8.68475 |
| 4 | 7 | −8.58612 |
| 5 | 9 | −13.76193 |
| 6 | 10 | 7.32599 |
| 7 | 12 | 21.08335 |

Zoom Lens Unit Data

| Lens unit | First surface | Focal length | Lens component length | Front principal point position | Rear principal point position |
|---|---|---|---|---|---|
| 1 | 1 | −16.46235 | 5.47628 | −0.28522 | −4.23806 |
| 2 | 5 | 13.61431 | 6.93039 | −0.40567 | −4.91845 |
| 3 | 14 | 21.08335 | 1.75000 | −0.09763 | −1.04906 |

Numerical Example 4

Unit: mm

Surface Data

|  |  |  |  | Effective diameter |
|---|---|---|---|---|
| Object Side | ∞ | ∞ |  |  |
| r1* = 23.154 | d1 = 1.30 | nd1 = 1.882997 | vd1 = 40.8 | 10.571 |
| r2* = 4.621 | d2 = 1.25 |  |  | 8.092 |
| r3 = 6.752 | d3 = 1.95 | nd2 = 1.808095 | vd2 = 22.8 | 8.220 |
| r4 = 14.774 | d4 = Variable |  |  | 7.659 |
| r5 (Stop) | d5 = −0.50 |  |  | 4.268 |
| r6* = 4.295 | d6 = 1.80 | nd3 = 1.830000 | vd3 = 59.0 | 4.294 |
| r7 = 12.516 | d7 = 0.20 |  |  | 3.762 |
| r8 = 13.732 | d8 = 0.50 | nd4 = 1.755199 | vd4 = 27.5 | 3.762 |
| r9 = 3.623 | d9 = 0.63 |  |  | 3.413 |
| r10 = 11.763 | d10 = 1.25 | nd5 = 1.830000 | vd5 = 59.0 | 3.472 |
| r11 = −23.823 | d11 = Variable |  |  | 3.628 |
| r12 = 18.956 | d12 = 1.30 | nd6 = 1.830000 | vd6 = 59.0 | 7.668 |
| r13 = 240.413 | d13 = Variable |  |  | 7.649 |
| r14 = ∞ | d14 = 1.35 | nd7 = 1.516330 | vd7 = 64.1 | 15.000 |
| r15 = ∞ |  |  |  | 15.000 |

Aspheric Coefficients

| r1 | k = −2.78352e−02 | B = 4.84528e−05 | C = −1.47451e−06 |
|---|---|---|---|
|  | D = 2.46422e−08 |  |  |
| r2 | k = −1.31983e+00 | B = 1.19356e−03 | C = 8.14552e−06 |
|  | D = −2.46989e−07 | E = 1.47594e−08 |  |
| r6 | k = −2.96087e−01 | B = −6.06186e−05 | C = −1.20269e−06 |

Various Data
Zoom ratio: 2.88666

|  | Wide-Angle End | Middle Zoom Positions | Telephoto End |
|---|---|---|---|
| Focal length | 5.90000 | 11.23263 | 17.03129 |
| F number | 2.83275 | 3.90461 | 5.05956 |
| Angle of view | 31.03511 | 17.53880 | 11.77414 |
| Image height | 3.55000 | 3.55000 | 3.55000 |

-continued

Unit: mm

| | | | |
|---|---|---|---|
| Total lens length | 26.18576 | 24.39776 | 26.53505 |
| BF | 4.81036 | 3.79598 | 3.45045 |
| d4 | 11.91515 | 4.16319 | 1.00536 |
| d11 | 4.59069 | 10.55465 | 15.84977 |
| d13 | 3.42005 | 2.40568 | 2.06015 |
| Entrance pupil position | 7.48829 | 4.79568 | 2.97243 |
| Exit pupil position | −15.85496 | −33.64705 | −81.52184 |
| Front principal point position | 11.25989 | 12.33336 | 16.46728 |
| Rear principal point position | −1.089639 | −7.4366417 | −13.58084 |

Single Lens Data

| Lens | First Surface | Focal Length |
|---|---|---|
| 1 | 1 | −6.75984 |
| 2 | 3 | 13.87891 |
| 3 | 6 | 7.16617 |
| 4 | 8 | −6.65871 |
| 5 | 10 | 9.64109 |
| 6 | 12 | 24.72794 |

Zoom Lens Unit Data

| Lens unit | First surface | Focal length | Lens component length | Front principal point position | Rear principal point position |
|---|---|---|---|---|---|
| 1 | 1 | −13.66480 | 4.50000 | 0.64244 | −2.30358 |
| 2 | 5 | 9.67132 | 4.37992 | −0.86690 | −3.32849 |
| 3 | 14 | 24.72764 | 1.30000 | −0.06065 | −0.76914 |

Numerical Example 5

Unit: mm

Surface Data

| | | | | Effective diameter |
|---|---|---|---|---|
| Object Side | ∞ | ∞ | | |
| r1* = 23.137 | d1 = 1.30 | nd1 = 1.882997 | νd1 = 40.8 | 10.965 |
| r2* = 4.603 | d2 = 1.25 | | | 8.384 |
| r3 = 6.719 | d3 = 1.95 | nd2 = 1.808095 | νd2 = 22.8 | 8.520 |
| r4 = 14.820 | d4 = Variable | | | 7.971 |
| r5 (Stop) | d5 = −0.50 | | | 4.248 |
| r6* = 4.056 | d6 = 1.80 | nd3 = 1.830000 | νd3 = 59.0 | 4.270 |
| r7 = 13.112 | d7 = 0.50 | nd4 = 1.755199 | νd4 = 27.5 | 3.751 |
| r8 = 3.342 | d8 = 0.64 | | | 3.424 |
| r9 = 13.126 | d9 = 1.25 | nd5 = 1.830000 | νd5 = 59.0 | 3.472 |
| r10 = −25.739 | d10 = Variable | | | 3.653 |
| r11 = 18.256 | d11 = 1.30 | nd6 = 1.830000 | νd6 = 59.0 | 7.645 |
| r12 = 183.260 | d12 = Variable | | | 7.601 |
| r13 = ∞ | d13 = 1.35 | nd7 = 1.516330 | νd7 = 64.1 | 15.000 |
| r14 = ∞ | | | | 15.000 |

Aspheric Coefficients

| r1 | k = −1.77445e−02 | B = 4.42241e−05 | C = −1.18966e−06 |
|---|---|---|---|
| | D = 2.46101e−08 | | |
| r2 | k = −1.36833e+00 | B = 1.23819e−03 | C = 9.71187e−06 |
| | D = −2.38970e−07 | E = 1.47596e−08 | |
| r6 | k = −2.96087e−01 | B = −6.06186e−05 | C = −1.20269e−06 |

-continued

Unit: mm

Zoom ratio: 2.88666

| | Wide-Angle End | Middle Zoom Positions | Telephoto End |
|---|---|---|---|
| Focal length | 5.90000 | 11.21829 | 17.01557 |
| F number | 2.83275 | 3.89963 | 5.05489 |
| Angle of view | 31.03511 | 17.55895 | 11.78471 |
| Image height | 3.55000 | 3.55000 | 3.55000 |
| Total lens length | 26.05690 | 24.31684 | 26.45408 |
| BF | 4.81062 | 3.78588 | 3.44998 |
| d4 | 11.97389 | 4.27473 | 1.12169 |
| d11 | 4.59069 | 10.54980 | 15.84007 |
| d13 | 3.42031 | 2.40557 | 2.05967 |
| Entrance pupil position | 7.50332 | 4.84658 | 3.04962 |
| Exit pupil position | −15.39841 | −32.90893 | −80.61591 |
| Front principal point position | 11.21380 | 12.29791 | 16.49586 |
| Rear principal point position | −5.40000 | −10.71829 | −16.51557 |

Single Lens Data

| Lens | First Surface | Focal Length |
|---|---|---|
| 1 | 1 | −6.72915 |
| 2 | 3 | 13.73430 |
| 3 | 6 | 6.49072 |
| 4 | 7 | −6.29383 |
| 5 | 9 | 10.62856 |
| 6 | 11 | 24.34102 |

Zoom Lens Unit Data

| Lens unit | First surface | Focal length | Lens component length | Front principal point position | Rear principal point position |
|---|---|---|---|---|---|
| 1 | 1 | −13.71195 | 4.50000 | 0.62656 | −2.32145 |
| 2 | 5 | 9.65430 | 4.19231 | −1.07486 | −3.26843 |
| 3 | 11 | 24.34102 | 1.30000 | −0.07831 | −0.78617 |

Various Data

Numerical Example 6

Unit: mm

Surface Data

| | | | | Effective diameter |
|---|---|---|---|---|
| Object Side | ∞ | ∞ | | |
| r1 = 27.325 | d1 = 1.80 | nd1 = 1.88300 | νd1 = 40.8 | 14.06 |
| r2* = 5.347 | d2 = 2.55 | | | 10.42 |
| r3 = 9.218 | d3 = 1.75 | nd2 = 1.92286 | νd2 = 18.9 | 10.65 |
| r4 = 15.325 | d4 = Variable | | | 10.14 |
| r5 (stop) | d5 = 0.40 | | | 5.29 |
| r6 = 9.340 | d6 = 1.50 | nd3 = 1.48749 | νd3 = 70.2 | 5.52 |
| r7 = 31.471 | d7 = 0.10 | | | 5.49 |
| r8* = 6.490 | d8 = 2.50 | nd4 = 1.83307 | νd4 = 52.6 | 5.52 |
| r9 = −11.055 | d9 = 0.85 | nd5 = 1.80610 | νd5 = 33.3 | 4.92 |
| r10 = 4.668 | d10 = 0.70 | | | 4.28 |
| r11 = 16.282 | d11 = 1.30 | nd6 = 1.53172 | νd6 = 48.8 | 4.32 |
| r12 = −21.966 | d12 = Variable | | | 4.30 |
| r13 = 21.183 | d13 = 1.20 | nd7 = 1.83307 | νd7 = 52.6 | 7.21 |
| r14 = −588.189 | d14 = Variable | | | 7.13 |

-continued

Unit: mm

| | | | | |
|---|---|---|---|---|
| r15 = ∞ | d15 = 1.00 | nd8 = 1.51633 | vd8 = 64.1 | 10.00 |
| r16 = ∞ | | | | 10.00 |

Aspheric Coefficients

| | | | |
|---|---|---|---|
| r2 | k = −1.66441e+000 | B = 8.93016e−004 | C = 1.53043e−006 |
| | D = −7.01058e−008 | E = 1.73458e−009 | |
| R8 | k = −3.42295e−001 | B = −2.59129e−005 | C = 5.83696e−007 |
| | D = −6.75585e−008 | E = 7.25435e−011 | |

Various Data
Zoom ratio: 4.61

| | Wide-Angle End | Middle Zoom Positions | Telephoto End |
|---|---|---|---|
| Focal length | 4.69 | 12.68 | 21.60 |
| F number | 2.56 | 4.13 | 5.97 |
| Angle of view | 32.76 | 13.39 | 7.95 |
| Image height | 3.02 | 3.02 | 3.02 |
| Total lens length | 45.45 | 40.41 | 47.24 |
| BF | 0.50 | 0.50 | 0.50 |
| d4 | 20.87 | 5.51 | 2.03 |
| d12 | 3.36 | 14.14 | 25.79 |
| d14 | 5.08 | 4.61 | 3.27 |
| Entrance pupil position | 9.17 | 6.05 | 4.65 |
| Exit pupil position | −18.15 | −84.97 | 123.59 |
| Front principal point position | 12.68 | 16.85 | 30.04 |
| Rear principal point position | −4.19 | −12.18 | −21.10 |

Single Lens Data

| Lens | First Surface | Focal Length |
|---|---|---|
| 1 | 1 | −7.83 |
| 2 | 3 | 22.04 |
| 3 | 6 | 26.65 |
| 4 | 8 | 5.25 |
| 5 | 9 | −3.98 |
| 6 | 11 | 17.80 |
| 7 | 13 | 24.57 |
| 8 | 15 | 0.00 |

Zoom Lens Unit Data

| Lens unit | First surface | Focal length | Lens component length | Front principal point position | Rear principal point position |
|---|---|---|---|---|---|
| 1 | 1 | −13.16 | 6.10 | 0.58 | −3.85 |
| 2 | 5 | 12.25 | 7.35 | −0.86 | −5.38 |
| 3 | 13 | 24.57 | 1.20 | 0.02 | −0.63 |
| 4 | 15 | ∞ | 1.00 | 0.33 | −0.33 |

Numerical Example 7

Unit: mm

Surface Data

| | | | | | Effective diameter |
|---|---|---|---|---|---|
| Object Side | ∞ | ∞ | | | |
| r1 = 27.325 | d1 = 1.80 | nd1 = 1.88300 | vd1 = 40.8 | | 13.85 |
| r2* = 5.240 | d2 = 2.60 | | | | 10.26 |
| r3 = 9.320 | d3 = 1.75 | nd2 = 1.92286 | vd2 = 18.9 | | 10.50 |
| r4 = 16.040 | d4 = Variable | | | | 10.00 |
| r5 (stop) | d5 = 0.40 | | | | 5.31 |
| r6 = 9.892 | d6 = 1.50 | nd3 = 1.48749 | vd3 = 70.2 | | 5.53 |
| r7 = 30.127 | d7 = 0.10 | | | | 5.52 |
| r8* = 6.486 | d8 = 2.50 | nd4 = 1.84273 | vd4 = 53.9 | | 5.57 |
| r9 = −8.503 | d9 = 0.85 | nd5 = 1.80100 | vd5 = 35.0 | | 5.02 |
| r10 = 4.718 | d10 = 0.70 | | | | 4.34 |
| r11 = 19.605 | d11 = 1.30 | nd6 = 1.53172 | vd6 = 48.8 | | 4.37 |
| r12 = −18.975 | d12 = Variable | | | | 4.36 |
| r13 = 21.552 | d13 = 1.20 | nd7 = 1.84273 | vd7 = 53.9 | | 7.19 |
| r14 = −511.823 | d14 = Variable | | | | 7.11 |
| r15 = ∞ | d15 = 1.00 | nd8 = 1.51633 | vd8 = 64.1 | | 10.00 |
| r16 = ∞ | | | | | 10.00 |

Aspheric Coefficients

| | | | |
|---|---|---|---|
| r2 | k = −1.64653e+000 | B = 9.25086e−004 | C = −1.97992e−007 |
| | D = −1.23821e−009 | E = 4.30500e−010 | |
| r8 | k = −3.50878e−001 | B = −5.12830e−005 | C = 6.45404e−007 |
| | D = −1.90144e−007 | E = 5.65296e−009 | |

Various Data
Zoom ratio: 4.61

| | Wide-Angle End | Middle Zoom Positions | Telephoto End |
|---|---|---|---|
| Focal length | 4.69 | 12.67 | 21.60 |
| F number | 2.56 | 4.13 | 5.97 |
| Angle of view | 32.76 | 3.39 | 7.95 |
| Image height | 3.02 | 3.02 | 3.02 |
| Total lens length | 45.56 | 40.49 | 47.29 |
| BF | 0.50 | 0.50 | 0.50 |
| d4 | 20.65 | 5.29 | 1.81 |
| d12 | 3.81 | 14.56 | 26.19 |
| d14 | 4.90 | 4.43 | 3.09 |
| Entrance pupil position | 9.01 | 5.92 | 4.52 |
| Exit pupil position | −19.07 | −93.85 | 116.38 |
| Front principal point position | 12.57 | 16.89 | 30.14 |
| Rear principal point position | −4.19 | −12.17 | −21.10 |

Single Lens Data

| Lens | First Surface | Focal Length |
|---|---|---|
| 1 | 1 | −7.63 |
| 2 | 3 | 21.43 |
| 3 | 6 | 29.49 |
| 4 | 8 | 4.73 |
| 5 | 9 | −3.68 |
| 6 | 11 | 18.35 |
| 7 | 13 | 24.57 |
| 8 | 15 | 0.00 |

Zoom Lens Unit Data

| Lens unit | First surface | Focal length | Lens component length | Front principal point position | Rear principal point position |
|---|---|---|---|---|---|
| 1 | 1 | −13.03 | 6.15 | 0.48 | −4.04 |
| 2 | 5 | 12.25 | 7.35 | −0.71 | −5.29 |
| 3 | 13 | 24.57 | 1.20 | 0.03 | −0.63 |
| 4 | 15 | ∞ | 1.00 | 0.33 | −0.33 |

TABLE 1

| Condition | Numerical Example | | | | | | |
|---|---|---|---|---|---|---|---|
| | 1 | 2 | 3 | 4 | 5 | 6 | 7 |
| (1) | 2.42 | 2.42 | 2.42 | 2.42 | 2.42 | 2.35 | 2.38 |
| (2) | 1.83 | 1.83 | 1.83 | 1.83 | 1.83 | 1.83 | 1.84 |
| (3) | 59.0 | 59.0 | 59.0 | 59.0 | 59.0 | 52.60 | 53.90 |
| (4) | 0.522 | 0.489 | 0.638 | 0.741 | 0.672 | 0.43 | 0.39 |
| (5) | 0.482 | 0.486 | 0.491 | 0.525 | 0.549 | 0.48 | 0.48 |
| (6) | 2.42 | 2.42 | 2.42 | 2.42 | 2.42 | 2.36 | 2.38 |
| (7) | 1.83 | 1.83 | 1.83 | 1.83 | 1.83 | 1.83 | 1.84 |
| (8) | 59.0 | 59.0 | 59.0 | 59.0 | 59.0 | 52.60 | 53.90 |
| (9) | 0.914 | 0.815 | 0.757 | 0.767 | 0.750 | 0.86 | 0.88 |
| (10) | 1.102 | 1.109 | 1.121 | 1.071 | 1.073 | 1.10 | 1.10 |

A digital camera (optical apparatus) that uses a zoom lens according to an exemplary embodiment of the present invention as a photographic optical system will now be described below with reference to FIG. 29.

Referring to FIG. 29, the digital camera includes a camera body 20 and a photographic optical system 21. The photographic optical system 21 includes a zoom lens described in any one of the first through the fifth exemplary embodiments. The digital camera further includes an image sensor (photoelectrical conversion element) 22, such as a CCD sensor or a CMOS sensor, which is built-in in the camera body 20 and receives an object image formed by the photographic optical system 21.

The digital camera further includes a recording unit 23 configured to record information corresponding to an object image photoelectrically converted by the image sensor 22. Furthermore, the digital camera includes a viewfinder 24 that includes a display device (not illustrated) configured to allow a user to observe an object image formed on the image sensor 22. The display device display an image of the object formed on the image sensor 22.

In addition, the digital camera includes a liquid crystal display panel, which includes a function similar to that of the viewfinder. By applying the zoom lens according to any one of the first through the fifth exemplary embodiments of the present invention, a small-sized optical apparatus having a high optical performance can be implemented.

According to any one of the first through the fifth exemplary embodiments of the present invention, in a three-unit zoom lens, the second lens unit L2 or the third lens unit L3 has a configuration appropriate enough to achieve a zoom lens having a high optical performance, whose total size of the zoom lens system is small-sized, and having a high zoom ratio.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-327089 filed Dec. 19, 2007, which is hereby incorporated by reference herein in its entirety.

What is claimed is:

1. A zoom lens comprising, in order from an object side to an image side:

a first lens unit having a negative refractive power;

a second lens unit having a positive refractive power, the second lens unit including a positive lens; and a third lens unit having a positive refractive power, wherein intervals between adjacent ones of the first lens unit, the second lens unit, and the third lens unit are variable during zooming, wherein a refractive power of a material of the positive lens included in the second lens unit (Nd2P) and an Abbe number of the material of the positive lens included in the second lens unit (vd2P) satisfy the following conditions:

$Nd2P + 0.01 \times vd2P > 2.3$ $1.65 < Nd2P < 2.7$ $vd2P > 45$, and wherein a focal length of the positive lens included in the second lens unit (f2P) and a focal length of the second lens unit (f2) satisfy the following condition:

$0.37 < f2P/f2 < 0.85$.

2. The zoom lens according to claim 1, wherein the second lens unit includes a plurality of negative lenses, and wherein the positive lens included in the second lens unit is located adjacent to and on an object side of a negative lens having the shortest focal length of the focal lengths of the plurality of negative lenses.

3. The zoom lens according to claim 1, wherein the second lens unit includes a plurality of negative lenses, and wherein a thickness of the positive lens included in the second lens unit on an optical axis (2P), a thickness of a negative lens included in the second lens unit having a focal length shortest of focal lengths of the plurality of negative lenses included in the second lens unit (2N), and a thickness of the entire second lens unit on the optical axis (2D) satisfy the following condition:

$0.40 < (2P + 2N)/2D < 0.60$.

4. The zoom lens according to claim 1, wherein the third lens unit is movable towards the object side for focusing from an infinitely distant object to a close object, wherein the third lens unit includes a positive lens, and wherein a refractive index of a material of the positive lens included in the third lens unit (Nd3P) and an Abbe number of the positive lens included in the third lens unit (vd3P) satisfy the following conditions:

$Nd3P + 0.01 \times vd3P > 2.3$ $1.65 < Nd3P < 2.7$ $vd3P > 45$.

5. The zoom lens according to claim 1, wherein the third lens unit includes a positive lens, and wherein a focal length of the third lens unit (f3) and a radius of curvature of a surface of the positive lens on the object side included in the third lens unit (R31) satisfy the following condition:

$0.7 < R31/f3 < 1.0$.

6. The zoom lens according to claim 1, wherein an image-forming magnification of the third lens unit at a wide-angle end ($\beta 3W$) and an image-forming magnification of the third lens unit at a telephoto end ($\beta 3T$) satisfy the following condition:

$1.0 < \beta 3T/\beta 3W < 1.3$.

7. An image pickup apparatus comprising:
a zoom lens; and
a photoelectric conversion element configured to receive an image formed by the zoom lens,
wherein the zoom lens comprises, in order from an object side to an image side:
 a first lens unit having a negative refractive power;
 a second lens unit having a positive refractive power, the second lens unit including a positive lens; and
 a third lens unit having a positive refractive power,
wherein intervals between adjacent ones of the first lens unit, the second lens unit, and the third lens unit are variable during zooming,
wherein a refractive power of a material of the positive lens included in the second lens unit (Nd2P) and an Abbe number of the material of the positive lens included in the second lens unit (vd2P) satisfy the following conditions:

$Nd2P+0.01 \times vd2P>2.3$ $1.65<Nd2P<2.7$ $vd2P>45$, and
wherein a focal length of the positive lens included in the second lens unit (f2P) and a focal length of the second lens unit (f2) satisfy the following condition:

$0.37<f2P/f2<0.85$.

8. A zoom lens comprising, in order from an object side to an image side:
a first lens unit having a negative refractive power;
a second lens unit having a positive refractive power; and
a third lens unit having a positive refractive power,
wherein intervals between adjacent ones of the first lens unit, the second lens unit, and the third lens unit are variable during zooming,
wherein the third lens unit is movable towards the object side for focusing from an infinitely distant object to a close object,
wherein the third lens unit includes a positive lens,
wherein a refractive power of a material of the positive lens included in the third lens unit (Nd3P) and an Abbe number of the material of the positive lens included in the third lens unit (vd3P) satisfy the following conditions:

$Nd3P+0.01 \times vd3P>2.3$ $1.65<Nd3P<2.7$ $Nd3P>45$, and
wherein an image-forming magnification of the third lens unit at a wide-angle end ($\beta 3W$) and an image-forming magnification of the third lens unit at a telephoto end ($\beta 3T$) satisfy the following condition:

$1.0<\beta 3T/\beta 3W<1.3$.

9. The zoom lens according to claim 8, wherein a focal length of the third lens unit (f3) and a radius of curvature of a surface of the positive lens on the object side included in the third lens unit (R31) satisfy the following condition:

$0.7<R31/f3<1.0$.

10. An image pickup apparatus comprising:
a zoom lens;
a photoelectric conversion element configured to receive an image formed by the zoom lens,
wherein the zoom lens comprises, in order from an object side to an image side:
 a first lens unit having a negative refractive power;
 a second lens unit having a positive refractive power; and
 a third lens unit having a positive refractive power,
wherein intervals between adjacent ones of the first lens unit, the second lens unit, and the third lens unit are variable during zooming,
wherein the third lens unit is movable towards the object side for focusing from an infinitely distant object to a close object,
wherein the third lens unit includes a positive lens, and
wherein a refractive power of a material of the positive lens included in the third lens unit (Nd3P) and an Abbe number of the material of the positive lens included in the third lens unit (vd3P) satisfy the following conditions:

$Nd3P+0.01 \times vd3P>2.3$ $1.65<Nd3P<2.7$ $Nd3P>45$, and
wherein an image-forming magnification of the third lens unit at a wide-angle end ($\beta 3W$) and an image-forming magnification of the third lens unit at a telephoto end ($\beta 3T$) satisfy the following condition:

$1.0<\beta 3T/\beta 3W<1.3$.

11. A zoom lens comprising, in order from an object side to an image side:
a first lens unit having a negative refractive power;
a second lens unit having a positive refractive power, the second lens unit including a positive lens; and
a third lens unit having a positive refractive power,
wherein intervals between adjacent ones of the first lens unit, the second lens unit, and the third lens unit are variable during zooming,
wherein a refractive power of a material of the positive lens included in the second lens unit (Nd2P) and an Abbe number of the material of the positive lens included in the second lens unit (vd2P) satisfy the following conditions:

$Nd2P+0.01 \times vd2P>2.3$ $1.65<Nd2P<2.7$ $vd2P>45$, and
wherein an image-forming magnification of the third lens unit at a wide-angle end ($\beta 3W$) and an image-forming magnification of the third lens unit at a telephoto end ($\beta 3T$) satisfy the following condition:

$1.0<\beta 3T/\beta 3W<1.3$.

12. An image pickup apparatus comprising:
a zoom lens; and
a photoelectric conversion element configured to receive an image formed by the zoom lens, wherein the zoom lens comprises, in order from an object side to an image side:
a first lens unit having a negative refractive power;
a second lens unit having a positive refractive power, the second lens unit including a positive lens; and
a third lens unit having a positive refractive power,
wherein intervals between adjacent ones of the first lens unit, the second lens unit, and the third lens unit are variable during zooming,
wherein a refractive power of a material of the positive lens included in the second lens unit (Nd2P) and an Abbe number of the material of the positive lens included in the second lens unit (vd2P) satisfy the following conditions:

$Nd2P+0.01 \times vd2P > 2.3$ $1.65 < Nd2P < 2.7$ $vd2P > 45,$ and wherein an image-forming magnification of the third lens unit at a wide-angle end ($\beta 3W$) and an image-forming magnification of the third lens unit at a telephoto end ($\beta 3T$) satisfy the following condition:

$1.0 < \beta 3T/\beta 3W < 1.3.$

* * * * *